United States Patent [19]
Tanazawa et al.

[11] Patent Number: 5,965,855
[45] Date of Patent: Oct. 12, 1999

[54] DETECTING DEVICE, METHOD FOR MANUFACTURING THE DETECTING DEVICE AND ELECTRONIC APPARATUS USING THE DETECTING DEVICE

[75] Inventors: Masayoshi Tanazawa, Fuchu; Hiroshi Takenaka, Iruma, both of Japan

[73] Assignee: Casio Computer Co., Ltd., Tokyo, Japan

[21] Appl. No.: 09/001,026

[22] Filed: Dec. 30, 1997

[30]     Foreign Application Priority Data

Jan. 14, 1997  [JP]  Japan ................................... 9-016002
Sep. 12, 1997  [JP]  Japan ................................... 9-265159
Sep. 30, 1997  [JP]  Japan ................................... 9-281200

[51] Int. Cl.⁶ ................................................. H01H 35/14
[52] U.S. Cl. .............................. 200/61.45 M; 200/61.52; 335/205; 29/622
[58] Field of Search ................... 200/61.45 R–61.45 M; 73/488, 514.01, 514.16; 335/205, 207; 29/622

[56]              References Cited

U.S. PATENT DOCUMENTS 3,520,200  10/1967  Rodgers ..................................... 73/517
3,619,524  11/1971  Gillund ................................. 200/61.45
4,001,185   1/1977  Mitsui et al. ..................... 200/61.45 R
4,833,281   5/1989  Maples ............................. 200/61.45 R
4,914,263   4/1990  Behr ................................. 200/61.45 M
4,959,513   9/1990  Maniar ............................. 200/61.45 M
4,988,839   1/1991  Kennicott ......................... 200/61.45 M
5,209,343   5/1993  Romano et al. ....................... 200/61.52

FOREIGN PATENT DOCUMENTS 2263019  7/1993  United Kingdom ........... H01H 35/14

*Primary Examiner*—Michael A. Friedhofer
*Attorney, Agent, or Firm*—Frishauf, Holtz, Goodman, Langer & Chick

[57]                    ABSTRACT

A detecting device includes a device body having a containing chamber formed therein, a plurality of electrode members which are provided in the containing chamber in parallel to one another, a conductive movable body which is movably arranged in a space surrounded by the plurality of electrode members, and a magnet which generates a magnetic holding force for holding the conductive movable body. When an external force is applied to the device body, the conductive movable body is moved against the magnetic holding force of the magnet and is brought into electrical contact with at least two of the plurality of electrode members, thereby causing a detection signal corresponding to the electrical contact to be output.

13 Claims, 33 Drawing Sheets

DETECTING DEVICE, METHOD FOR MANUFACTURING THE DETECTING DEVICE AND ELECTRONIC APPARATUS USING THE DETECTING DEVICE

BACKGROUND OF THE INVENTION

1. Field of the Invention

The invention relates to a detecting device, a method for manufacturing the detecting device, and an electronic apparatus using the detecting device.

2. Description of Related Art

Conventionally, a detecting device using a piezo-electric element has been known for detecting acceleration. Such devices have been incorporated in small-sized portable equipment such as a wristwatch or the like.

For example, a conventional detecting device comprises a piezo-electric element attached to a circuit supporter in a wristwatch case, and a weight mounted to the surface of the piezo-electric element. In such a device, when an acceleration is given to the weight by suddenly moving the wristwatch case from the piezo-electric element side to the weight side or from the weight side to the piezo-electric element side, and by suddenly stopping the movement, the piezo-electric element is compressed by the energy of the weight to generate a voltage in the piezo-electric element, and the generated voltage is detected as a detection signal.

Another conventional detecting device comprises a piezo-electric element arranged at a lower end position in a containing chamber which is formed in a watch case, a magnet arranged at an upper position in the containing chamber, and a movable body which is attracted by the magnet and can also move in the containing chamber. In such a device, when an acceleration is given to the movable body by suddenly moving the wristwatch case upward or downward and by suddenly stopping the movement, the movable body is moved downward against the magnetic force of the magnet to contact and compress piezo-electric element, thereby causing the piezo-electric element to generate a voltage which is detected as a detection signal.

However, according to the above described conventional detecting devices, because a structure is required for generating a voltage by applying a pressure to the piezo-electric element, only one of accelerations in the upward and downward (vertical) direction and in the right and left (horizontal) direction can be detected. In such detecting devices, moreover, a control circuit is required for reforming the waveform of voltage supplied from the piezo-electric element, and the complexity and production cost are thus increased. Further, there is a problem in that the whole device requires a large size because a weight or a movable body having a large mass is required to sufficiently detect the waveform of the voltage supplied from the piezo-electric element.

Still further, in a conventional acceleration sensor, a conductive ball is ordinarily lifted up by the magnetic force of a magnet and is held at the upper limit position spaced upward from a pair of electrode pins. When the acceleration sensor is moved downward and thereafter suddenly stopped, or the acceleration sensor is moved upward suddenly, that is, when an upward acceleration is applied to the acceleration sensor, the conductive ball is moved downward to bring into contact with a pair of electrode pins against the magnetic force of the magnet by the inertial force thereof. Thereby, the pair of electrode pins are electrically connected with each other through the conductive ball to output an acceleration detection signal.

In order to manufacture an acceleration sensor having such a structure, generally, a magnet which was previously magnetized, and a conductive ball are put in an upper containing chamber and a lower containing chamber, of a part of a housing, respectively. When the part of the housing is combined with another part of the housing, the conductive ball is often sprung out of the lower containing chamber of the part of the housing by the magnetic attraction force of the magnet. In order to overcome this problem, a magnetic material which was not magnetized, and a conductive ball are put in an upper containing chamber and a lower containing chamber, of a part of a housing, respectively, and the part of the housing is combined with another part of the housing while a pair of electrode pins are incorporated in the device, and thereafter the magnetic material is magnetized by magnetizing the whole acceleration sensor.

In such a conventional acceleration sensor, because not only the magnet but also the conductive ball and the electrode pins are magnetized, it is preferable to carry out demagnetization for the conductive ball and the electrode pins. However, although it is possible to demagnetize the electrode pins but, it is not possible to demagnetize the conductive ball because the conductive ball can freely move in the lower containing chamber of the housing. Accordingly, there is a problem in that it is impossible to detect a delicate acceleration because the detection sensitivity depends on the traveling position of the conductive ball.

Further, there is another problem in that adjustment of the detection sensitivity cannot be easily performed because the magnet is contained in the blocked upper containing chamber.

SUMMARY OF THE INVENTION

An object of the invention is to provide a detecting device which enables detection of acceleration in at least one of the vertical and horizontal two directions, which does not require any control circuit for reforming the voltage waveform, which has a simplified electronic circuit, and which is small in size.

Another object of the invention is to enable reliable return of the movable body, e.g., a conductive ball, to an initial position even if the holding force due to the magnetic force of the magnet is small, and to enable detection of even a delicate acceleration.

Another object of the invention is to enable a stable detection of even a delicate acceleration.

Another object of the invention is to enable an easy adjustment of the detection sensitivity.

In accordance with one aspect of the present invention, the detecting device comprises: a device body having a containing chamber formed therein; a plurality of electrode members which are provided in the containing chamber in parallel to one another; a conductive movable body which is movably arranged in a space surrounded by the plurality of electrode members; and a magnet for holding the conductive movable body by magnetic force function thereof; wherein when an external force is applied to the device body, the conductive movable body is moved against a holding force due to a magnetic force of the magnet to bring into electrical contact with the plurality of electrode members, and to output a detection signal which corresponds to the electrical contact.

Therefore, in such a detecting device of the invention, when an acceleration is applied in either of a direction to which the magnet attracts the movable body by magnetic force and a direction perpendicular thereto, the movable body is moved against the holding force based on the magnetic force of the magnet to be close by or to bring into contact with each electrode member, so that a corresponding detection signal is output. Thus, according to the detecting device, it is possible to surely detect an acceleration in at least one of the horizontal and vertical two directions. Further, because a piezo-electric element is not used, the device of the invention does not require a control circuit for reshaping voltage waveform, and it is possible to simplify the electronic circuit. Because a sufficient detection sensitivity can be obtained even if the mass of the movable body is not large, it is also possible to miniaturize the whole device.

In accordance with another aspect of the present invention, the method for manufacturing a detecting device comprises: a first step of assembling an insulating housing having a containing chamber formed therein, a pair of electrodes which are provided in the containing chamber of the housing, a conductive body which is movably arranged in the containing chamber of the housing so that the conductive body can be brought into contact with or separated from the pair of electrodes, and a magnet which is previously magnetized, for holding the conductive body at a position apart from or contact with the pair of electrodes by attracting the conductive body by magnetic force, ordinarily, wherein the magnet is provided at a predetermined outer position of the housing; and thereafter a second step of thermal demagnetizing the magnet by increasing a temperature for heating the detecting device to a predetermined temperature at least one time.

According to the method of the invention, for example, when a previously magnetized magnet is incorporated into a predetermined outer portion of the housing after the conductive body (movable body) and the pair of electrodes are incorporated in the containing chamber of the housing, it is possible to prevent the conductive body from spring out of the containing chamber of the housing in spite of the magnetic attraction force of the magnet. Further, because a previously magnetized magnet is incorporated in the predetermined portion, the conductive body is not magnetized, and thereby it is possible to detect even delicate acceleration stably.

Because the magnet is provided at the predetermined outer portion, and the conductive body is not magnetized, it is possible to easily exchange one for another having a different thickness and thereby to easily adjust the detection sensitivity of the device.

PREFERRED EMBODIMENT OF THE INVENTION

First Embodiment

The detecting device according to a first embodiment of the invention will be explained with reference to FIGS. 1 to 4.

Figure 1:
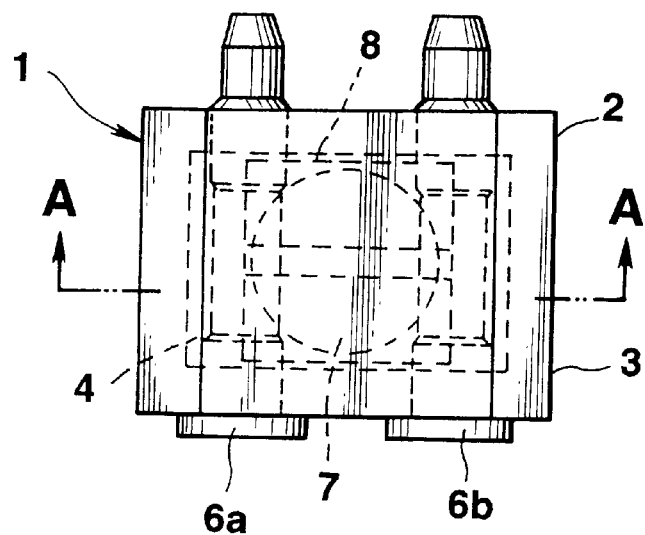
FIG. 1 is a plan view of the detecting device according to the first embodiment of the invention.
Figure 2:
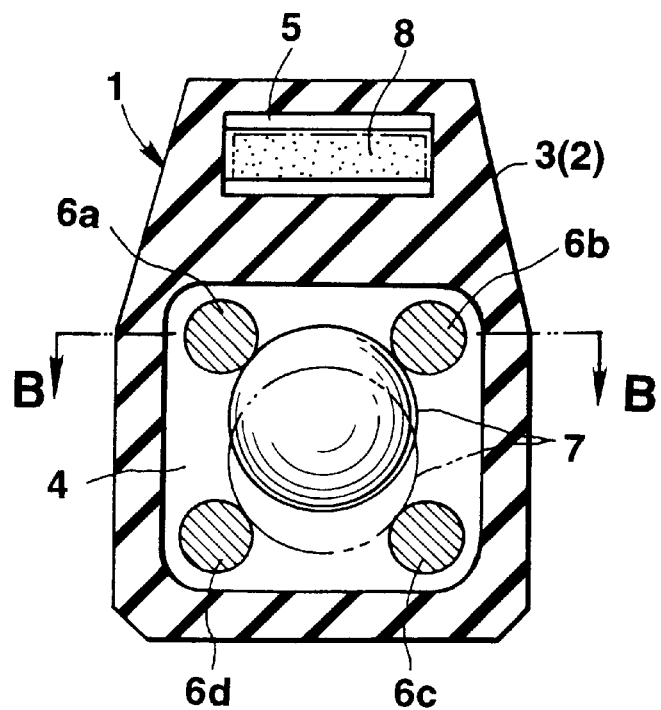
FIG. 2 is a cross-sectional view taken substantially along the line A—A of FIG. 1.
Figure 3:
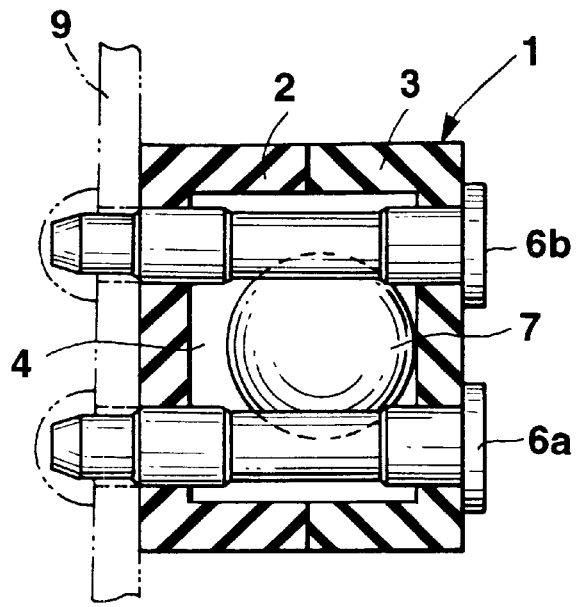
FIG. 3 is a cross-sectional view taken substantially along the line B—B of FIG. 2.

FIG. 1 is a plan view of the detecting device, FIG. 2 is a cross-sectional view taken on line A—A of FIG. 1, and FIG. 3 is a cross-sectional view taken on line B—B of FIG. 2.

The detecting device includes a device body 1 comprising a pair of casings 2 and 3 joined to each other. In the detecting device, a first containing chamber 4 is formed in a lower side thereof and a second containing chamber 5 is formed in the upper side. In the first containing chamber 4 of the detecting device, four electrode pins 6a to 6d are horizontally provided approximately parallel to each other, in the vicinity of positions corresponding to vertexes of a square. Each of the electrode pins 6a to 6d is made of conductive material such as a metal or the like, and each intermediate portion thereof is situated in the first containing chamber 4, and both ends of each electrode pin project to the outside of the device body 1.

In the first containing chamber 4, a conductive ball 7 is contained in a region surrounded by the four electrode pins 6a to 6d to be movable therein. The conductive ball 7 is made of metal such as iron or the like and is brought into contact with or separated from any adjacent two pins among the four pins 6a to 6d, to electrically connect the adjacent two electrode pins which are brought into contact with the conductive ball 7.

In the second containing chamber 5 which is provided above the conductive ball 7, a magnet 8 is provided for attracting the conductive ball 7 by magnetic force to lift it up and to bring it into contact with the two electrode pins 6a and 6b on the upper side.

Figure 4:
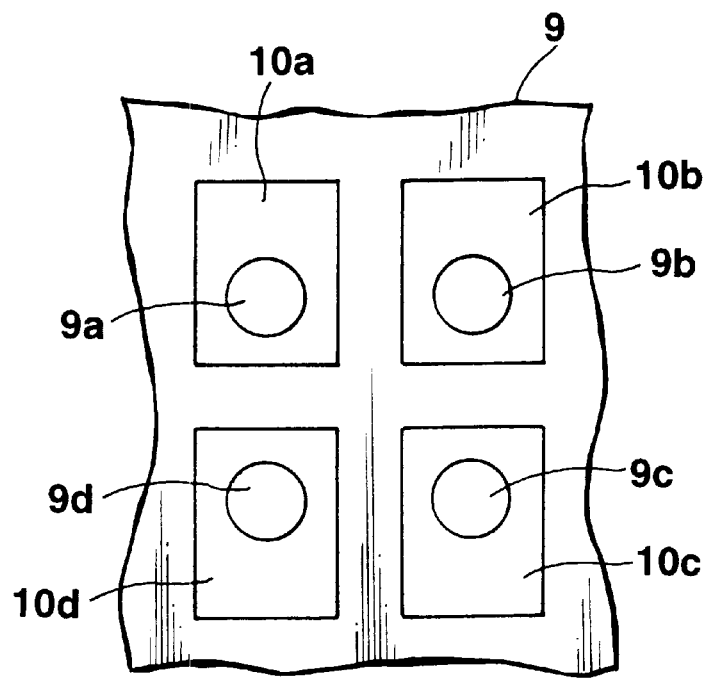
FIG. 4 is a front view of the circuit board in FIG. 2.

One end of each of the four electrode pins 6a to 6d is inserted into attachment holes 9a to 9d formed in a circuit board 9, respectively, as shown in FIGS. 3 and 4. These ends are mounted to electrode portions 10a to 10d provided in the respective peripheries of the attachment holes 9a to 9d, by soldering.

In such a detecting device, the conductive ball 7 is ordinarily lifted up by the magnetic force of the magnet 8, and moved above the lower two electrode pins 6c and 6d with a spacing and is in contact with the upper two electrode pins 6a and 6b. When the device body 1 is moved downward and thereafter suddenly stopped, or the device body 1 is suddenly moved upward, that is, when an upward acceleration is applied to the device body 1, the conductive ball 7 is moved downward from the upper two electrode pins 6a and 6b to contact the lower two electrode pins 6c and 6d against the holding force based on the magnetic force of the magnet 8 by means of the inertial force thereof. Thereby the lower two electrode pins 6c and 6d are electrically connected with each other through the conductive ball 7 to output a detection signal.

In the state in which the conductive ball 7 is lifted up by the magnetic force of the magnet 8 and is brought into contact with the upper two electrode pins 6a and 6b, as shown in FIG. 2, when the device body 1 is suddenly moved in the right and left direction or the movement in the right and left directions is suddenly stopped, that is, for example, when an acceleration in the right direction between the right and left directions is applied to the device body 1, the conductive ball 7 is moved to the left side against the magnetic force of the magnet 8 by the inertial force thereof to contact the left two electrode pins 6a and 6d. Accordingly, the left two electrode pins 6a and 6d are electrically connected with each other through the conductive ball 7 to output a detection signal. When an acceleration in the left direction is applied to the device body 1, the conductive ball 7 is moved to the right side against the magnetic force of the magnet 8 by the inertial force thereof to contact the right two electrode pins 6b and 6c. Accordingly, the right two electrode pins 6b and 6c are electrically connected with each other through the conductive ball 7 to output a detection signal.

As described above, in the detecting device, because the four electrode pins 6a to 6d are approximately horizontally provided in parallel to each other, in the vicinity of positions which correspond to vertexes of a square, when an acceleration is applied in either: (i) the vertical direction to which the magnet 8 disposed above these pins 6a to 6d attracts the conductive ball 7 by magnetic force, or (ii) the horizontal direction perpendicular thereto, the conductive ball 7 is moved against the holding force base on the magnetic force of the magnet 8 to contact the lower pair of electrode pins 6c and 6d opposite to the upper pair of electrode pins 6a and 6b, or either of the left pair of electrode pins 6a and 6d and the right pair of electrode pins 6b and 6c. As a result, detection signals can be obtained to detect an acceleration in the horizontal and vertical two directions. Further, because a piezo-electric element which was used in a conventional device is not used, the device of the embodiment does not require a control circuit for reshaping a voltage waveform and it is possible to simplify the electronic circuit. Because a sufficient detection sensitivity can be obtained even if the mass of the conductive ball 7 is not large, it is also possible to miniaturize the whole device. According to the detecting device of the embodiment, for example, it is possible to count the number of steps when a person uses it as a pedometer by walking with the device on the person's waist.

Because the detecting device has a structure in which one end of each of the four electrode pins 6a to 6d projects out of the device body 1, as shown in FIGS. 3 and 4, it is possible not only to easily mount the device body 1 to the circuit board 9 but also to perform necessary electrical connection only by inserting the projecting ends of the four electrode pins 6a to 6d into the attachment holes 9a to 9d of the circuit board 9 and soldering the ends to the electrode portions 10a to 10d provided in the peripheries of the attachment holes 9a to 9d. Accordingly, it is possible to simplify the attachment work and the electrical connection work therefor.

In the first embodiment, the four electrode pins 6a to 6d are connected to the electrode portions 10a to 10d of the circuit board 9 by soldering, respectively, and a lead wire is connected to each of the electrode portions 10a to 10d, to detect the accelerations in the vertical and horizontal two directions. However, the invention is not limited to this. For example, only three lead wires may be provided by short-circuiting the electrode portions 10a and 10b which correspond to the upper two electrode pins 6a and 6b. Such a structure also can detect the accelerations in the vertical and horizontal two directions.

Further, only two lead wires may be provided by short-circuiting the electrode portions 10a and 10b which correspond to the upper two electrode pins 6a and 6b, and short-circuiting the electrode portions 10c and 10d which correspond to the lower two electrode pins 6c and 6d. Such a structure enables detection of only the acceleration in the horizontal direction.

Only two lead wires may be provided by short-circuiting the electrode portions 10b and 10c which correspond to the upper two electrode pins 6b and 6c, and short-circuiting the electrode portions 10a and 10d which correspond to the lower two electrode pins 6a and 6d. Such a structure enables detection of only the acceleration in the vertical direction.

In the first embodiment, although only the case of using the magnet 8 which is arranged at a position above the four electrode pins 6a to 6d is explained, the invention is not limited to this. The device body 1 can be also used in a laid-down state on its side to have the same function and advantageous effects as the above-described first embodiment.

Figure 5:
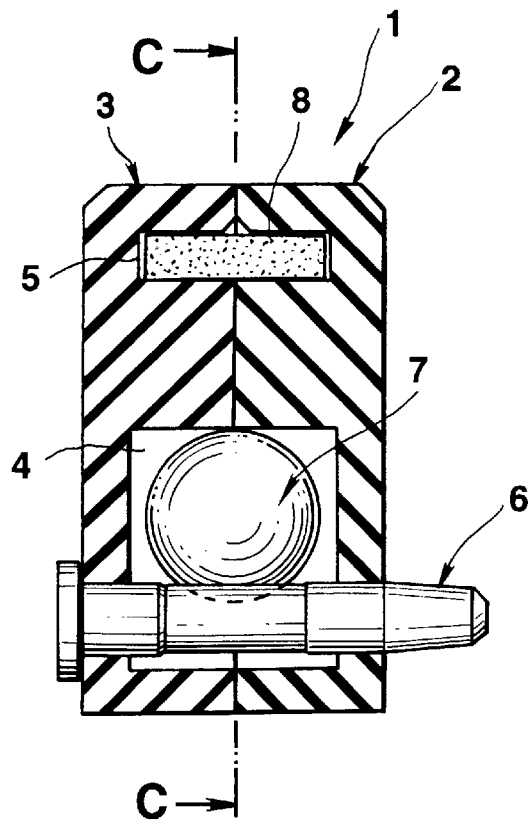
FIG. 5 is a cross-sectional view of a modified example of the first embodiment.

In the first embodiment, although the four electrode pins 6a to 6d are horizontally provided in approximately parallel to each other, in the vicinity of positions which correspond to vertexes of a square, the invention is not limited to this. For example, arrangements shown in FIGS. 5 and 6 can be also adopted. That is, in such a detecting device, a first containing chamber 4 is formed in a lower side of the device body 1. In the first containing chamber 4 of the detecting device, two electrode pins 6 and 6 which are made of conductive material such as a metal or the like, are approximately horizontally provided in parallel to each other at lower positions in the first containing chamber 4. In the first containing chamber 4, a conductive ball 7 made of metal such as iron or the like is contained to be movable vertically. In the second containing chamber 5 which is formed in an upper portion of the device body 1, a magnet 8 for attracting to lift the conductive ball 7 up is provided.

Figure 6:
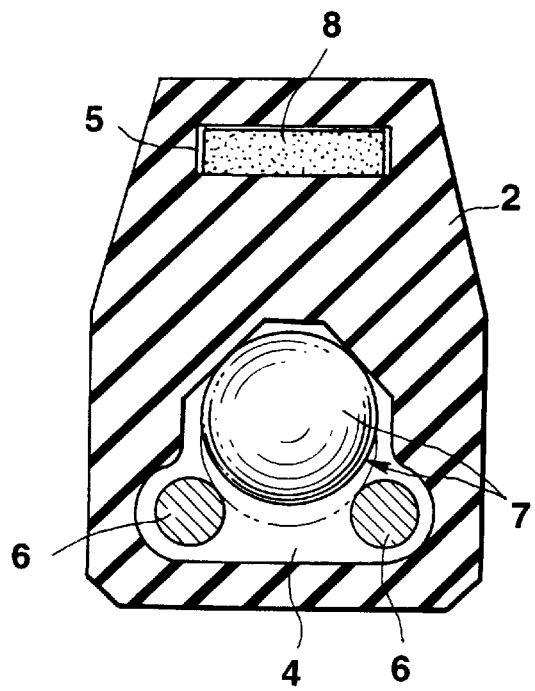
FIG. 6 is a cross-sectional view taken substantially along the line C—C of FIG. 5.

In such a detecting device, the conductive ball 7 is ordinarily lifted up by the magnetic force of the magnet 8 and moved above the two electrode pins 6 and 6 with a spacing, as shown in FIG. 6. When the device body 1 is moved downward and thereafter suddenly stopped or the device body 1 is suddenly moved upward, that is, when an upward acceleration is applied to the device body 1, the conductive ball 7 is moved downward against the holding force due to the magnetic force of the magnet 8, by the inertial force thereof and is brought into contact with the two electrode pins 6 and 6. Thereby the two electrode pins 6 and 6 are electrically connected with each other through the conductive ball 7 to output a detection signal, so that an acceleration in the vertical direction can be detected. Further, because a piezo-electric element which was used in a conventional device is not used, like the first embodiment, the device of the embodiment does not require a control circuit for reshaping voltage waveforms, and it is possible to simplify the electronic circuit. Because a sufficient detection sensitivity can be obtained even if the mass of the conductive ball 7 is not large, it is also possible to miniaturize the whole device. And because the detecting device has a structure in which one end of each of the electrode pins 6 and 6 project out of the device body 1, it is possible not only to easily mount the detecting device to the circuit board but also to perform a necessary electrical connection simultaneously. Accordingly, it is possible to simplify the attachment work and the electrical connection work therefor.

In the detecting device of the embodiment, for example, it is possible to count the number of steps when a person uses it as a pedometer by walking with the device on the person's waist.

Second Embodiment

The detecting device according to a second embodiment of the invention will be explained with reference to FIGS. 7 to 10. To structural members, elements or the like corresponding to those of the first embodiment shown in FIGS. 1 to 4, the same reference numerals are attached, and the detailed explanation for them is omitted.

Figure 7:
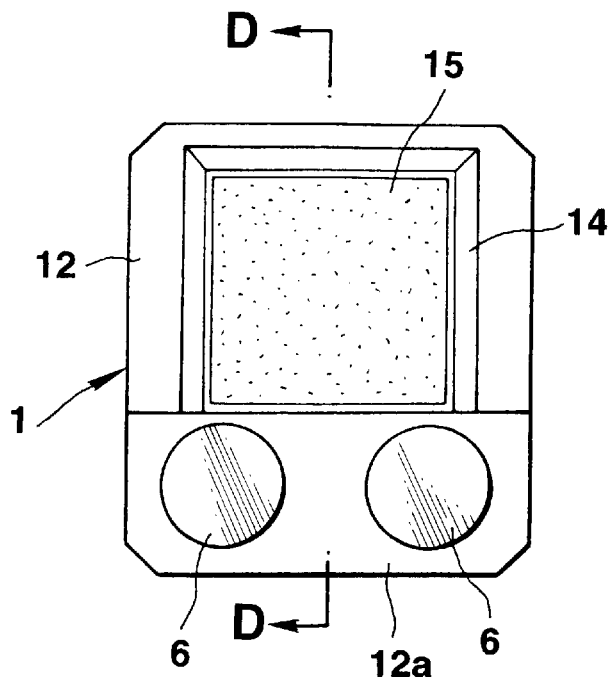
FIG. 7 is a front view of the detecting device according to the second embodiment of the invention.
Figure 8:
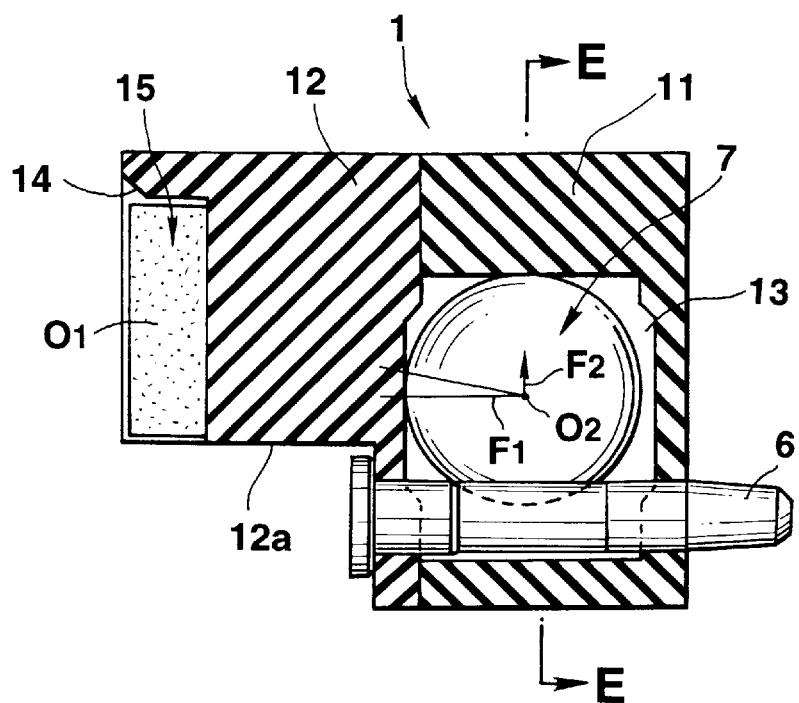
FIG. 8 is a cross-sectional view taken substantially along the line D—D of FIG. 7.
Figure 9:
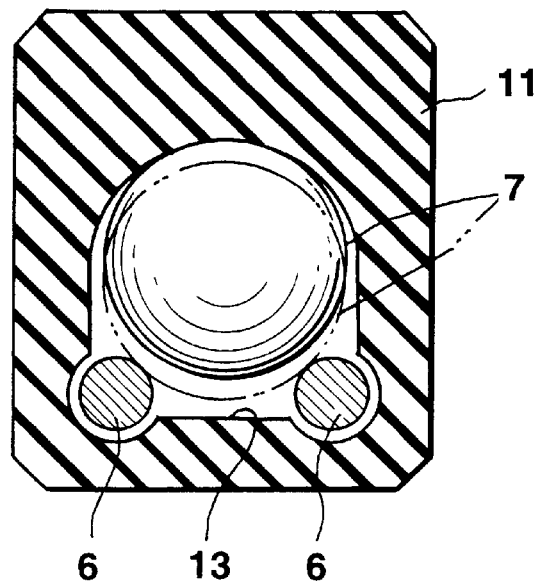
FIG. 9 is a cross-sectional view taken substantially along the line E—E of FIG. 8.

FIG. 7 is a front view of the detecting device, FIG. 8 is a cross-sectional view taken on line D—D of FIG. 7, and FIG. 9 is a cross-sectional view taken on line E—E of FIG. 8.

A device body 1 of the detecting device comprises a right casing 11 and a left casing 12 joined to each other. A first containing chamber 13 is formed in the right casing 11 and a second containing chamber 14 is formed in the left casing 12 to be positioned in a left side of the first containing chamber 13. In a lower side of the left casing 12, a cutout 12a is formed, as shown in FIG. 8. At a position of the device body 1 corresponding to the cutout 12a, two electrode pins 6 are approximately horizontally provided in parallel to each other, like the first embodiment. In this case, each intermediate portion of the electrode pins 6 is situated at a lower position of the first containing chamber 13, and both ends of each electrode pin 6 project to the outside of the device body 1.

In the first containing chamber 13 of the right casing 11, a conductive ball 7 is contained to bring into contact with or separate from the upper surface of the two electrode pins 6.

In the second containing chamber 14 of the left casing 12, which is positioned in the left side of the conductive ball 7, a magnet 15 is provided. The magnet 15 has a plate-like shape and is magnetized in the thickness direction (right and left direction in FIG. 8) thereof so that the conductive ball 7 can be lifted up toward the upper left in the first containing chamber 13 by the magnetic force of the magnet 15, as shown in FIG. 8, and can be held above the two electrode pins 6, as shown in FIG. 9.

Figure 10:
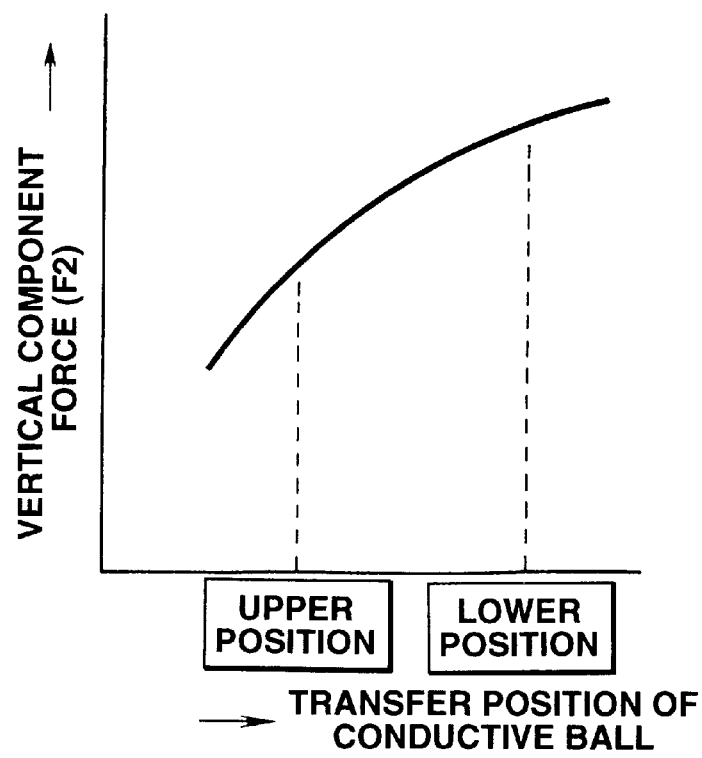
FIG. 10 is a graph for explaining the force due to the magnet shown in FIG. 8, for lifting the conductive ball up.

That is, the magnet 15 is arranged in a direction perpendicular to the axial direction of the two electrode pins 6. The center O1 of the magnet 15 is positioned above an intermediate position between the two electrode pins 6 in the front view, and the height thereof is the same as or higher than the position (initial position) of the center O2 of the conductive ball 7 lifted up by the magnetic force without application of acceleration. Therefore, the magnet 15 acts to attract the conductive ball 7 in the upper left direction and the force for the action is the resultant force of a horizontal component force F1 and a vertical component force F2. In the case, the horizontal component force F1 is one for attracting the conductive ball 7 to the left direction and the vertical component force F2 is one for lifting the conductive ball 7 up. The vertical component force F2 for lifting the conductive ball 7 up becomes zero (0) when the center O1 of the magnet 15 and the center O2 of the conductive ball 7 which is at the initial position are on a horizontal line together. However, when the center O1 of the magnet 15 is positioned above the center O2 of the conductive ball 7 at the initial position, the vertical component force F2 becomes larger as the conductive ball 7 is moved toward the lower side from the lifted initial position (the highest position) by an application of acceleration, as shown in FIG. 10.

In such a detecting device, the conductive ball 7 is ordinarily lifted up by the magnetic force of the magnet 15 and moved above the two electrode pins 6 with a spacing. When the device body 10 is moved downward and thereafter suddenly stopped, or the device body 10 is suddenly moved upward, that is, when an upward acceleration is applied to the device body 10, the conductive ball 7 is moved downward against the vertical component force F2 (lifting force) of the magnetic force of the magnet 15, by the inertial force thereof and is brought into contact with the two electrode pins 6. Thereby, the two electrode pins 6 are electrically connected with each other through the conductive ball 7 to output a detection signal. In the case, the vertical component force F2 for lifting the conductive ball 7 is the larger as the conductive ball 7 is moved downward by application of the acceleration from the lifted initial position without acceleration (the highest position). Accordingly, even if the force for holding the conductive ball 7 at the initial position is made smaller, it is possible to ensure returning of the downward-moved conductive ball 7 to the initial position. Therefore, according to the embodiment, it is possible to make the vertical component force F2 of the magnetic force of the magnet 15 at the initial position smaller, and to detect even a delicate acceleration. According to the embodiment, it is possible to greatly improve the detection sensitivity thereof, that is, although the lower limit of acceleration which can be detected by a conventional device was not less than 0.5 G, the detecting device according to this embodiment enables detection of even an acceleration not more than 0.3 G.

The detecting device does not require a control circuit for reforming the voltage waveform thereof and therefore enables simplification of the electronic circuit because no piezo-electric element is used, like the first embodiment. Because a sufficient detection sensitivity can be obtained even if the mass of the conductive ball 7 is not large, it is also possible to miniaturize the whole device.

Further, because the detecting device has a structure in which one ends of the electrode pins 6 and 6 project out of the device body 1, it is possible not only to easily mount the detecting device to the circuit board but also to perform necessary electrical connection at the same time, like the first embodiment. Accordingly, it is possible to simplify the attachment work and the electrical connection work therefor.

Third Embodiment

A third embodiment in which the detecting device according to the invention is applied as a pedometer for an electronic wristwatch will be explained with reference to FIGS. 11 to 16. To structural members, elements or the like corresponding to those of the second embodiment shown in FIGS. 7 to 10, the same reference numerals are attached, and the detailed explanation for them is omitted.

Figure 11:
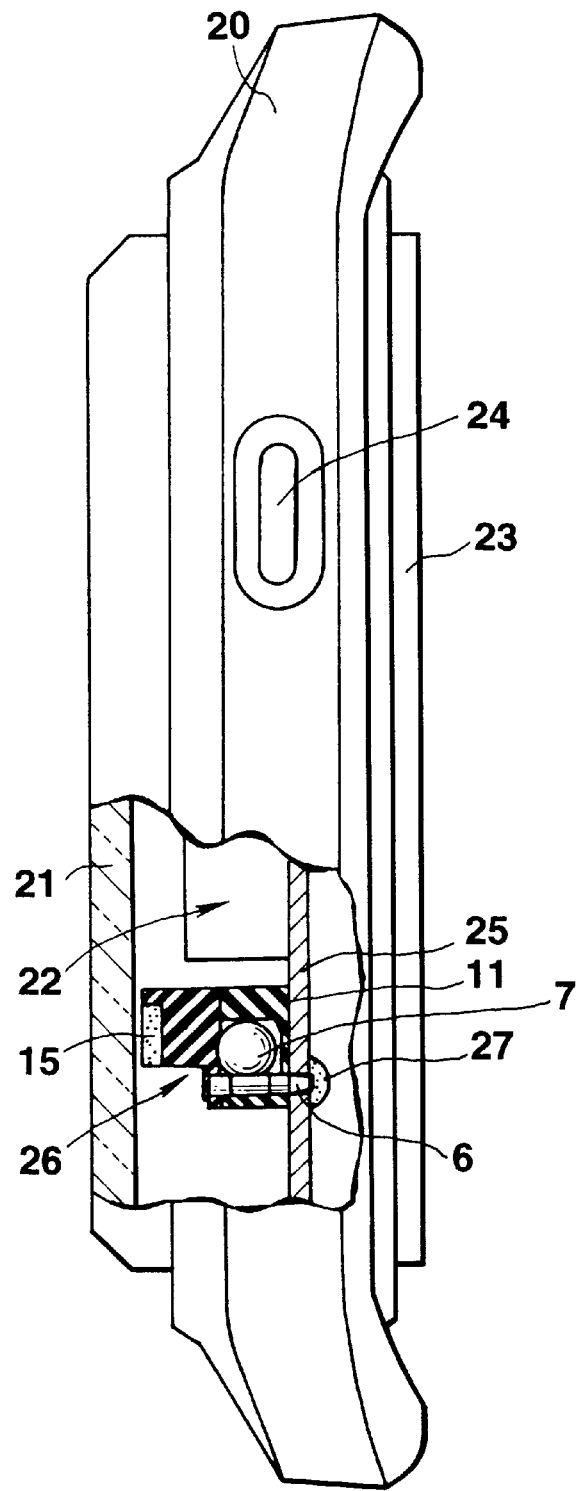
FIG. 11 is a side view including a partially sectional view, of the electronic wristwatch according to the sixth embodiment in which a detecting device of the invention is used as a pedometer.

FIG. 11 is a side view including a partial section, of the electronic watch.

The electronic wristwatch comprises a case complete 20, a glass 21 attached to the upper surface (the left side surface in the Figure) of the case complete 20, a wristwatch module 22 contained therein, a case back 23 attached to the lower surface (the right side surface in the Figure) of the case complete 20, and various types of button switches 24 provided on the side surface of the case complete 20, used for mode change, time correction and the like.

The wristwatch module 22 is of a digital type and has a display portion such as a liquid crystal display device or the like, and a circuit board 25 therein. A detecting device 26 for a pedometer is attached to the circuit board 25.

Figure 12:
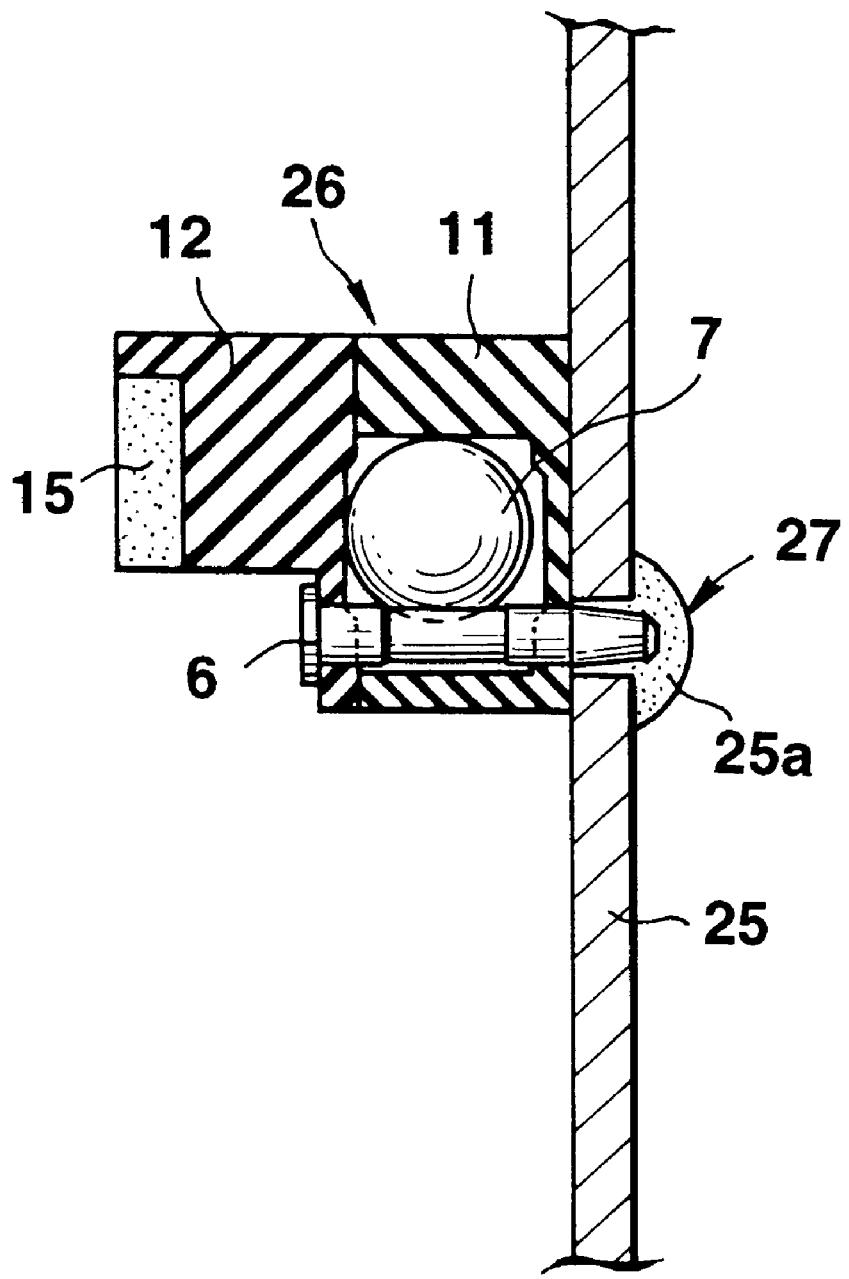
FIG. 12 is an enlarged view showing a principal portion of FIG. 11.

The detecting device 26 has the same structure as that of the second embodiment, and is mounted to the circuit board 25 by inserting the top end of one of the two electrode pins which project to the right side of right casing 11, into an attachment hole 25a to fix by using solder 27, as shown in FIG. 12.

Figure 13:
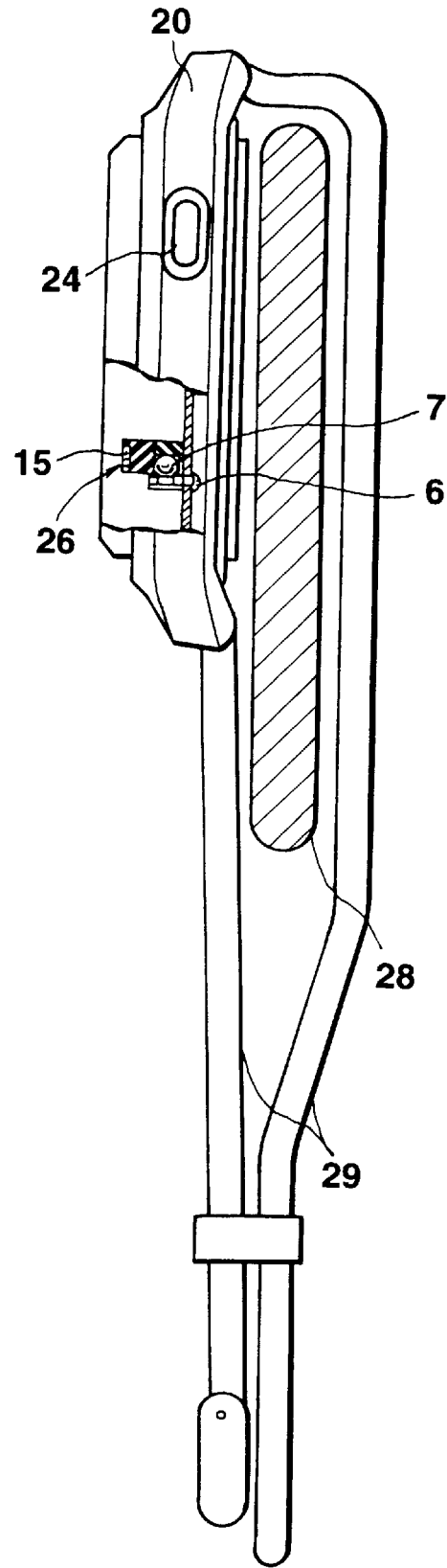
FIG. 13 is a side view showing a state of the electronic wristwatch shown in FIG. 11 attached to a waist band.
Figure 14:
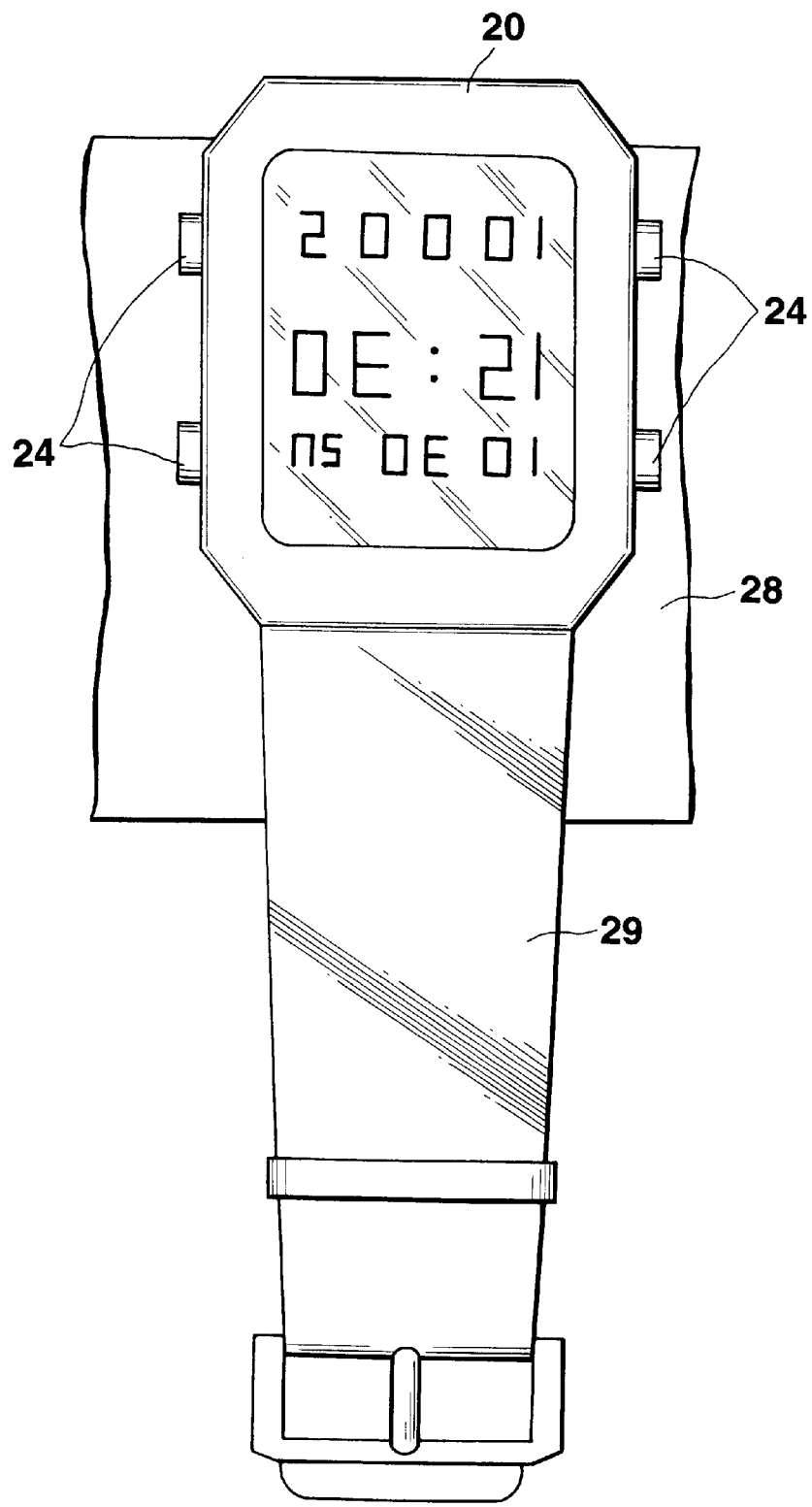
FIG. 14 is a front view of the state of FIG. 13.

In order to use the electronic watch as a pedometer, the electronic watch is installed to a belt 28 for waist by using watch bands 29 so that the "twelve o'clock" side and the "six o'clock" side of the watch are at lower and upper positions, respectively, as shown in FIGS. 13 and 14. As a result, the detecting device 26 is disposed at a position in the "twelve o'clock" side of the watch and is in a state that the conductive ball 7 is at a position upper than that of the two electrode pins 6. When a person with the watch performs walking motions, an acceleration is caused to the device body 10 every step to bring the conductive ball 7 into electrically contact with the two electrode pins 6 and thereby to output a detection signal.

Figure 15:
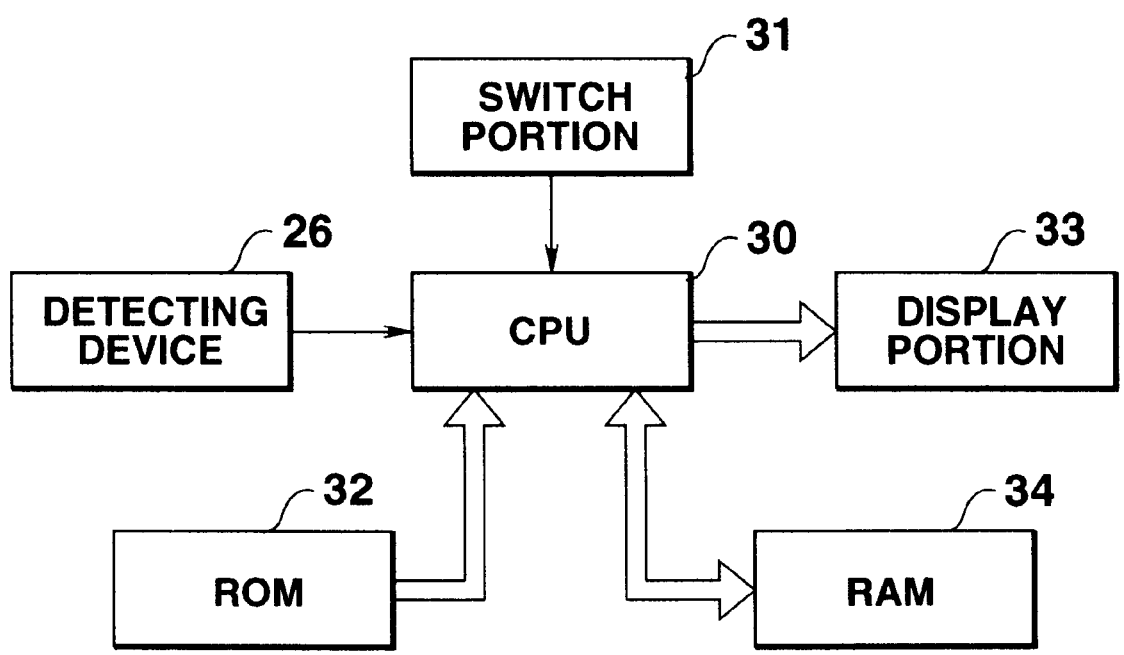
FIG. 15 is a circuit block diagram for the electronic wristwatch shown in FIG. 11.

An embodiment of a circuit construction will be explained with reference to FIG. 15.

When an instruction for the watch mode, the time correction mode, the timer setting mode, or the like is given from the switch portion 31 including various types of button switches 24, a CPU 30 makes a display portion 33 display an information such as the time or the like, according to a program from a ROM 32. When an instruction for the pedometer mode is given from the switch portion 31, the CPU 30 performs an operation for the detection signals which is given from the detecting device 26, according to a program from the ROM 32, and makes a RAM 34 store the operated data as the data of number of steps, and makes the display portion 33 display the number of steps by reading the stored data thereof.

Figure 16:
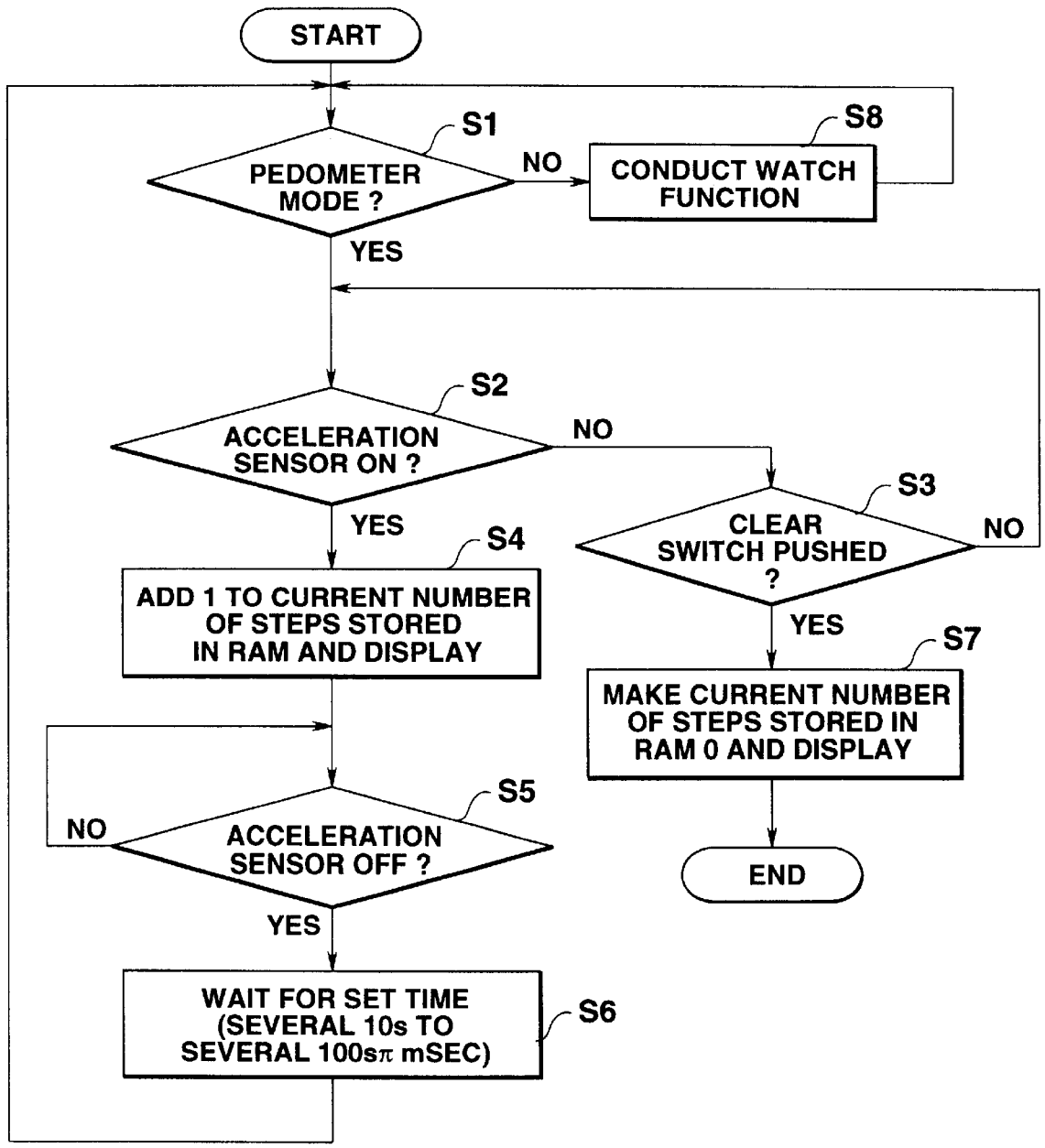
FIG. 16 is an operation flow chart of the pedometer in the electronic wristwatch in FIG. 11.

Next, a processing flowchart of the pedometer in the electronic wristwatch will be explained with reference to FIG. 16.

When the flow starts, whether it is the pedometer mode or not is judged at a step S1. When it is the pedometer mode, the flow proceeds to a step S2 to judge whether the detecting device 26 is ON or not, that is, whether the two electrode pins 6 are in electrically contact with each other or not, through the conductive ball 7. When being not ON, the flow proceeds to a step S3 to judge whether a clear switch is pushed or not. When the clear switch is not pushed, the flow returns to the step S2 to wait until the detecting device 26 comes to be ON. When the detecting device 26 comes to be ON at the step S2, the flow proceeds to a step S4 to display a number of steps which is "the number of steps which is stored in the RAM 34 at the present time (it was "0" when starting)" plus 1, and proceeds to a step S5 to judge whether the detecting device 26 is OFF or not, that is, whether the conductive ball 7 separates from the two electrode pins 6 or not. When being not OFF, the flow waits until the detecting device 26 comes to be OFF.

When the detecting device 26 comes to be OFF in the step S5, the flow proceeds to a step S6 and returns to the step S1 after waiting for a set time, for example, several tens to several hundreds seconds. The above-described steps are repeated to keep counting the number of steps until the clear switch is pushed at the step S3. When judging at the step S3 that the clear switch is pushed, the flow proceeds to a step S7 to make all the number of steps which is stored in the RAM 34 at the present time clear, that is, to "0". The "0" is displayed as the present number of steps and then the flow is finished. When judging at the step S1 that it is not the pedometer mode, the flow proceeds to a step S8 to perform processing for a watch function based on the watch mode, the time correction mode, the timer setting mode, or the like.

As described above, according to the electronic wristwatch, when a person is walking with the electronic watch 20 installed to the belt 28 for waist by using watch bands 29, an acceleration is caused to the device body 10 every step to bring the conductive ball 7 into electrically contact with the two electrode pins 6 and thereby to output a detection signal, so that the number of steps can be counted on the basis of the detection signal. Because the detecting device 26 has the same structure as one of the first embodiment of the invention, it is possible to detect even a delicate acceleration, therefore, even if the person's stride is short to generate only a small acceleration, it is possible to ensure detecting the number of steps. According to the embodiment, it is possible to obtain an electronic wristwatch including a high-precision pedometer.

Figure 17:
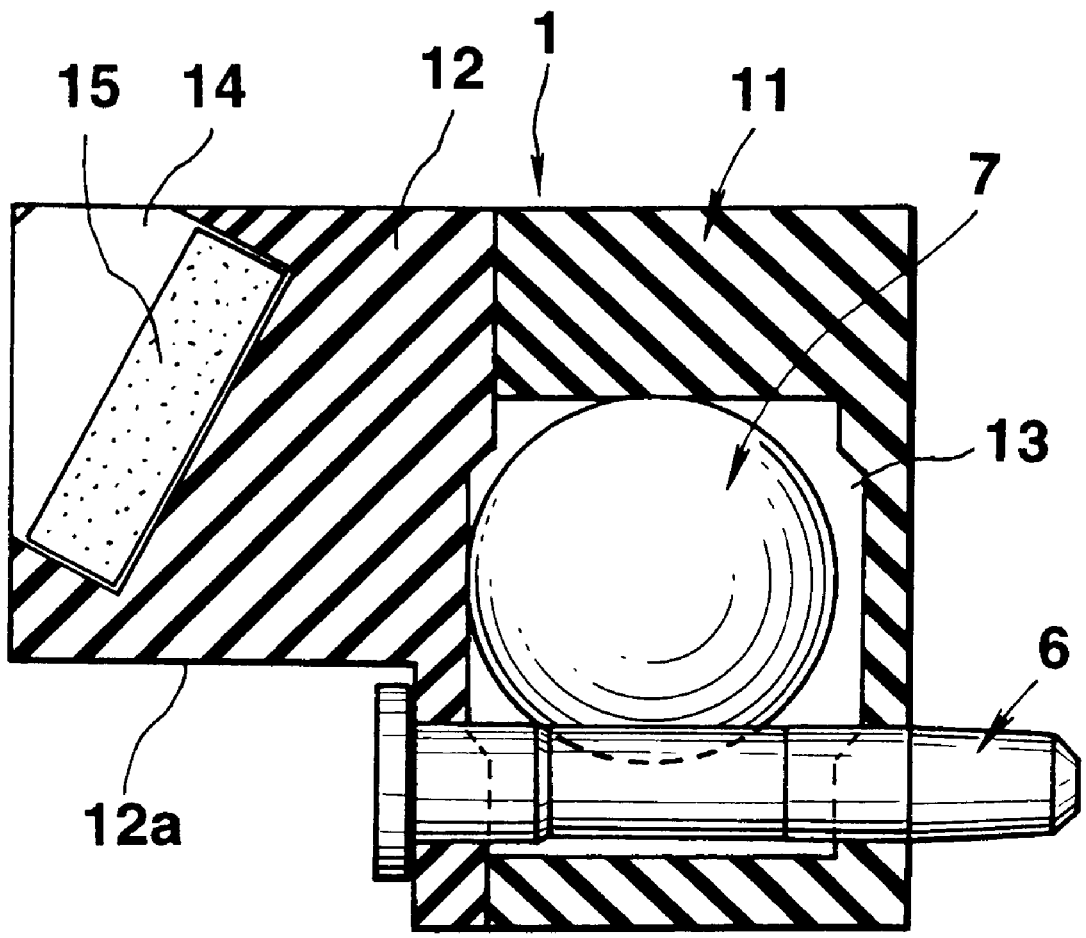
FIG. 17 is a cross-sectional view of the detecting device according to another embodiment of the invention.

In the above-described second and third embodiments, although the magnet 15 of the detecting device 26 is arranged in a direction perpendicular to the axial direction of the two electrode pins 6, the invention is not limited to this. For example, the magnet 15 may be arranged at an upper-left position of the conductive ball 7 to incline the upper portion of the magnetized surface closer to the conductive ball 7, as shown in FIG. 17.

According to such an arrangement, the magnetic force of the magnet 15 acts to attract the conductive ball 7 in an upper-left direction, and it is considered that the force of the action is a resultant force of a horizontal component force F1 and a vertical component force F2. The vertical component force F2 becomes larger as the conductive ball 7 is moved from the lifted initial position with no application of acceleration toward the lower side by an application of acceleration, like the first embodiment. Accordingly, even if the force for holding the conductive ball 7 at the initial position is made smaller, it is possible to ensure returning of the downward-moved conductive ball 7 to the initial position and to detect even a delicate acceleration.

In the above-described second and third embodiments, although the conductive ball 7 made of metal such as iron or the like is used as a movement body for electrically connecting the two electrode pins 6 to each other, and the magnet 15 is arranged in a lateral side of the conductive ball 7 to attract the conductive ball 7 by the magnetic force of the magnet 15, the present invention is not limited to this.

For example, a movement body of a magnet which is made by forming a electrically conductive film such as a metal plating or the like, on the surfaces of a plate-like magnetic material and by magnetizing it in the thickness direction, may be also used. The movement body may be arranged on two electrode pins 6 and a magnet 15 having magnetic poles which repel the movement body may be arranged just under the two electrode pins 6, to arrange the movement body at an initial position above and spaced from the two electrode pins 6 by making the magnet 15 and the movement body repel each other through mutual magnetic forces. In this case, it is not necessarily required to arrange the movement body in the upper side of the two electrode pins 6, for example, two electrode pins 6 may be arranged in the upper side, the movement body may be arranged in the lower side thereof, and the movement body may be brought into contact with the two electrode pins 6 in an ordinary state and may be separated from the two electrode pins 6 when an acceleration is applied.

In the above-described second and third embodiments, although the two electrode pins 6 are disposed horizontally, they are not necessarily disposed horizontally, for example, they may be inclined with a tilt angle within 30o so that each one ends of the electrode pins 6 are lower than each the other ends thereof.

Although two electrode pins 6 made of metal are used as a pair of electrode members, the invention is not limited to this, a pair of electrode plates or a pair of electrode contacts may be also used.

As described above, in the embodiment, when an acceleration is applied in either of the direction in which the magnet attracts the movable body by its magnetic force and the direction perpendicular thereto, the movable body is moved against the holding force based on the magnetic force of the magnet, to come closer to particular two electrode members or to bring into contact with opposed two electrode members, among four electrode members which are approximately horizontally provided in parallel to each other, in the vicinity of positions which are vertexes of a square. Accordingly, it is possible to take a detection signal out surely and thereby to ensure detection of acceleration in the horizontal and vertical two directions. Further, because no piezo-electric element is used, the device of the embodiment does not require a control circuit for reshaping voltage waveform, it is possible to simplify the electronic circuit. Because a sufficient detection sensitivity can be obtained even if the mass of the movable body is not large, it is also possible to miniaturize the whole device.

Further, according to the embodiment, because the magnet is arranged at a position at which the force for returning the movable body which is contained in the containing chamber of the device body and can be brought into contact with or separated from a pair of electrode members, to the initial position is the larger as the movable body is moved away from the initial position without acceleration, even if the holding force at the initial position, due to the magnetic force of the magnet is made smaller, it is possible to ensure returning of the movable body to the initial position. Therefore, according to the embodiment, it is possible to make the holding force at the initial position, due to the magnetic force of the magnet smaller, to detect even a delicate acceleration, and to improve the detection sensitivity thereof. Further, the detecting device does not require a control circuit for reforming the voltage waveform thereof and therefore enables simplification of the electronic circuit because no piezo-electric element is used, like the preceding embodiment. Because a sufficient detection sensitivity can be obtained even if the mass of the movable body is not large, it is also possible to miniaturize the whole device.

Because the detecting device has a structure in which a portion of each of the plurality of electrode members projects out of the device body, passing through the containing chamber, it is possible not only to easily mount the detecting device to a board only by inserting the portion of each electrode member into, for example, through holes formed in the board, and by soldering the portion of each electrode member to electrode portions provided in the peripheries of the attachment holes of the board. Further, because an electrical connection is carried out simultaneously, it is possible to simplify the attachment work and the electrical connection work.

Fourth Embodiment

Figure 18:
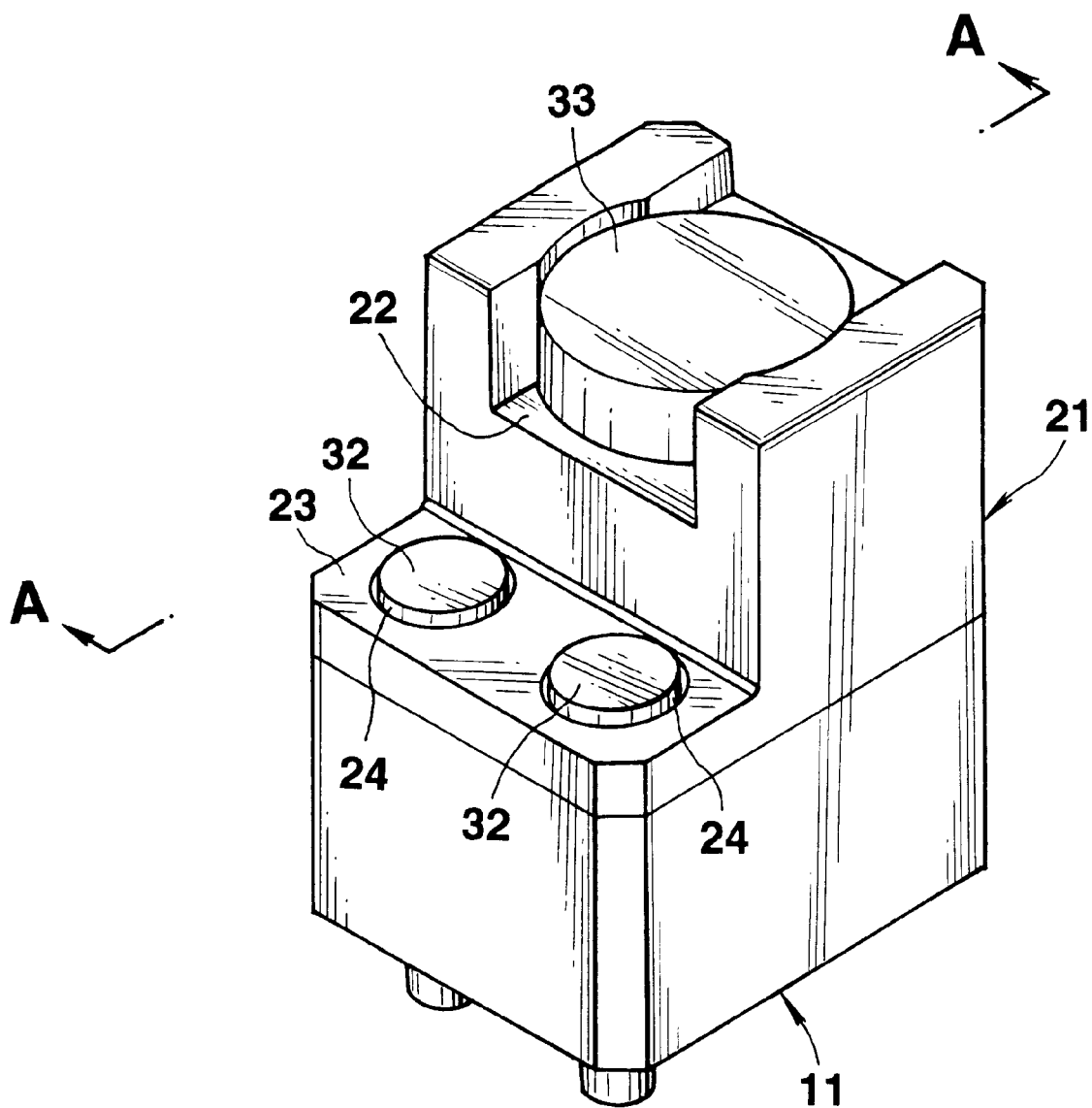
FIG. 18 is a perspective view of the acceleration sensor according to the fourth embodiment of the invention.
Figure 19:
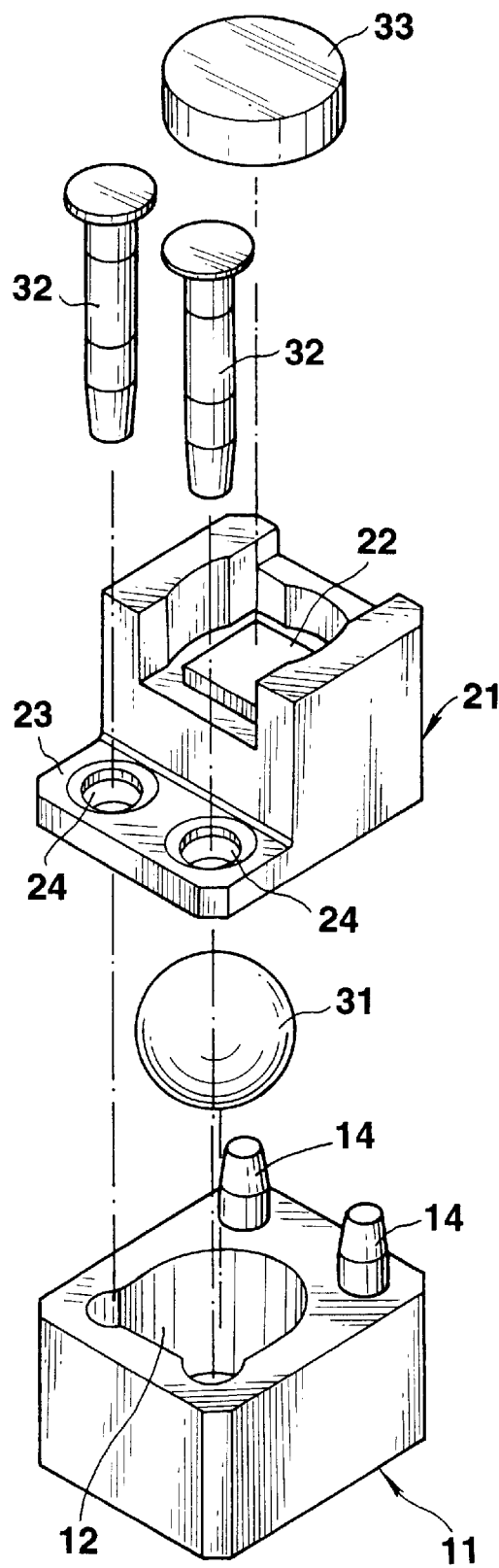
FIG. 19 is an exploded perspective view of the acceleration sensor.
Figure 20:
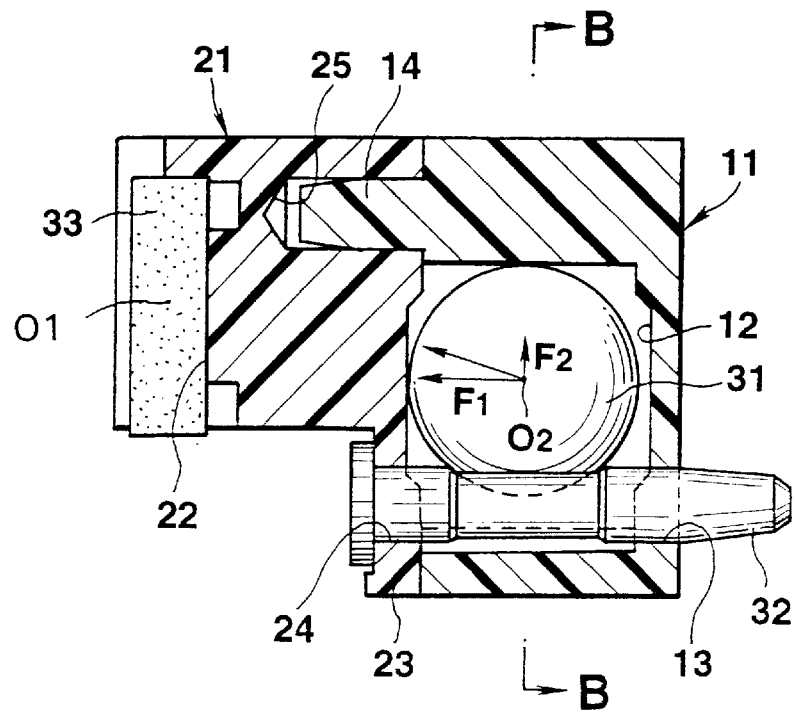
FIG. 20 is a cross-sectional view taken substantially along the line A—A of FIG. 18.
Figure 21:
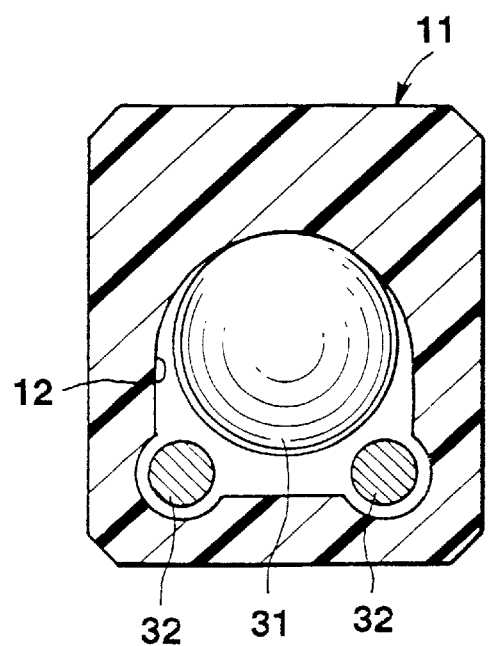
FIG. 21 is a cross-sectional view taken substantially along the line B—B of FIG. 20.

FIG. 18 is a perspective view of an acceleration sensor according to the fourth embodiment of the invention, FIG. 19 is an exploded perspective view thereof, FIG. 20 is a cross-sectional view taken substantially along the line A—A of FIG. 18, and FIG. 21 is a cross-sectional view taken substantially along the line B—B of FIG. 20.

The acceleration sensor comprises first and second housings 11 and 21, a conductive ball 31, a pair of electrode pins 32, and a magnet 33.

At a predetermined position of the first housing 11, a containing recess portion 12 is formed. At other predetermined two positions of the first housing 11, pin insertion holes 13 are formed to communicate with the containing recess portion 12. At further predetermined two positions of the first housing 11, engagement projections 14 are provided. At an outer predetermined position of the second housing 21, a containing recess portion 22 is formed. At another outer predetermined position of the second housing 21, a projective portion 23 with a plate-like shape, which has pin insertion holes 24 formed at predetermined two positions, is provided. At further predetermined two positions of the second housing 21, engagement recesses 25 are formed.

The conductive ball 31 has a structure, for example, of an iron ball and a metal film for anti-oxidizing formed on the ball.

The magnet 33 has a disc-shape and is magnetized in the thickness direction.

Next, the way to assemble the acceleration sensor will be explained with reference to FIGS. 24A to 24D.

Figure 24A:
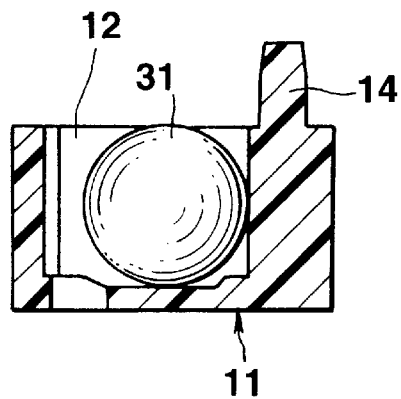
FIGS. 24A to 24D are cross-sectional views for explaining the steps to assemble the acceleration sensor.

First, a conductive ball 31 is contained in the containing recess portion 12 of the first housing 11, as shown in FIG. 24A.

Figure 24B:
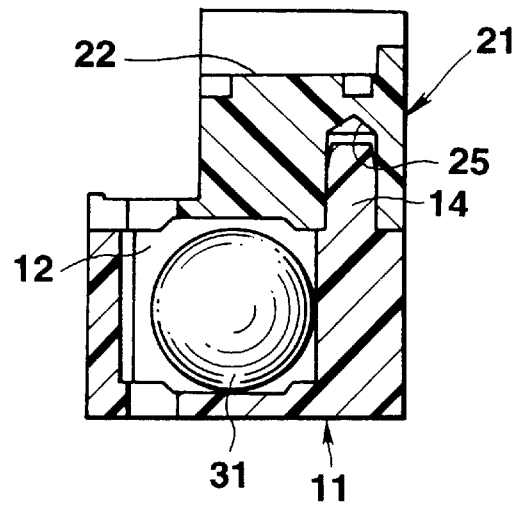

Thereafter, a predetermined surface of the second housing 21 is lapped on a predetermined surface of the first housing 11, while engaging the two engagement projections 14 of the first housing 11 with the engagement recesses 25 of the second housing 21, as shown in FIG. 24B. In this state, the containing recess 12 of the first housing 11 is covered with the second housing 21.

Figure 24C:
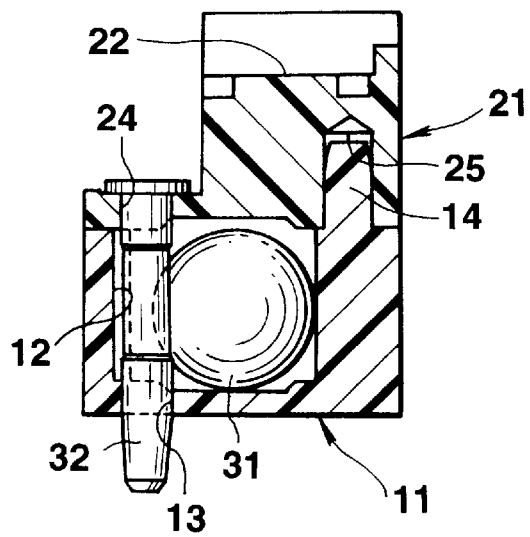

The pair of electrode pins 32 are inserted through the two pin insertion holes 24 of the second housing 21, and the containing recess portion 12 and the two pin insertion holes 13 of the first housing 11, to project each top end of the electrode pins 32 out of the first housing 11, as shown in FIG. 24C. In the state, the pair of electrode pins 32 are horizontally attached in parallel to each other, as shown in FIGS. 20 and 21. The conductive ball 31 contained in the containing recess portion 12 of the first housing 11, is movable upward and downward in FIG. 4, that is, the conductive ball 31 can be brought into contact with or separated from the pair of electrode pins 32.

Figure 24D:
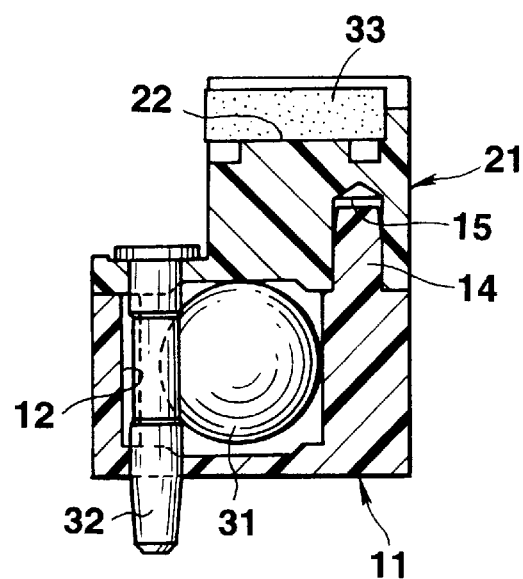

Thereafter, the magnet 33 which was previously magnetized is contained in the containing recess portion 22 of the second housing 21 through an adhesive or a pressure sensitive adhesive double coated tape, which is not shown, as shown in FIG. 24D. Thus, assembling of the acceleration sensor is completed.

As described above, in the acceleration sensor, because the pair of electrode pins 32 are incorporated after the conductive ball 31 is incorporated into the containing recess portion 12 of the first housing 11, and the second housing 21 is lapped on the first housing 11, and thereafter the magnet 33 which was previously magnetized is contained in the containing recess portion 22 provided at an outer position of the second housing 21, it is possible to prevent the conductive ball 31 from spring out of the containing recess 12 of the first housing 11 even if the conductive ball 31 is attracted by the magnetic force of the magnet 33 when the magnet 33 is incorporated therein. Further, because no magnetizing is carried out after incorporation, the conductive ball 31 is not magnetized, and thereby it is possible to detect even delicate acceleration, e.g., about 0.2 G, stably.

A magnet 33 which was previously magnetized may be contained in the containing recess portion 22 of the second housing 21 before the second housing 21 is lapped on the first housing 11. According to such a way, it is possible to obtain approximately the same advantageous effects as the above-described embodiment.

Because the magnet 33 is incorporated in the containing recess portion 22 which is formed at an outer portion of the second housing 21, it is possible to easily exchange the magnet 33 for another one having a different thickness and thereby to easily adjust the detection sensitivity of the acceleration sensor.

Figure 23:
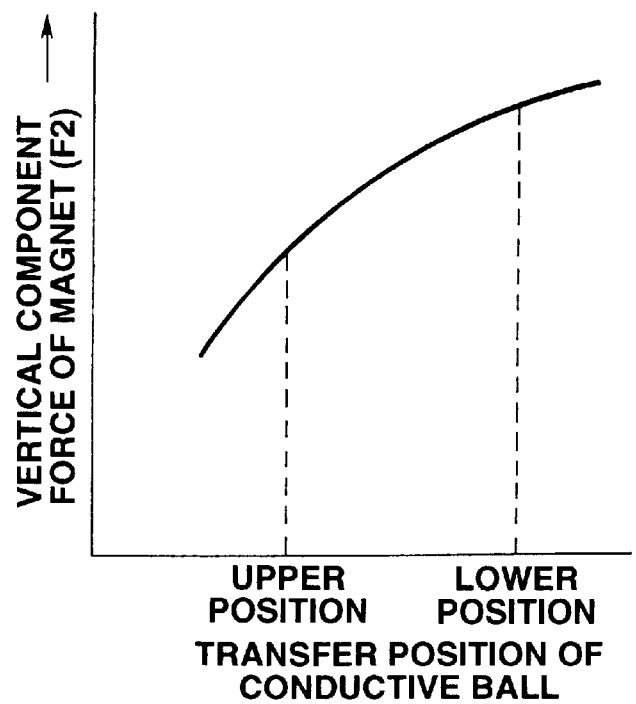
FIG. 23 is a graph for explaining the force due to the magnet in the acceleration sensor, for lifting the conductive ball up.

In an ordinary state of the acceleration sensor, the height of the center O1 of the magnet 33 is the same as or higher than the position of the center O2 of the conductive ball 31, as shown in FIG. 20. Therefore, the magnet 33 acts to attract the conductive ball 31 in the upper left direction in FIG. 20 and the force for the action is the resultant force of a horizontal component force F1 and a vertical component force F2. In the case, the horizontal component force F1 is one for attracting the conductive ball 31 to the left direction and the vertical component force F2 is one for lifting the conductive ball 31 up. The vertical component force F2 for lifting the conductive ball 31 up becomes zero (0) when the center O1 of the magnet 33 and the center O2 of the conductive ball 31 are on a horizontal line together. However, when the center O1 of the magnet 33 is positioned above the center O2 of the conductive ball 31, the vertical component force F2 becomes larger as the conductive ball 31 is moved toward the lower side from the highest position by which the conductive ball 31 is lifted up, by an application of acceleration, as shown in FIG. 23.

In an ordinary state of the acceleration sensor, the conductive ball 31 is ordinarily lifted up by the magnetic force of the magnet 33, and moved and held at the highest position above the pair of electrode pins 32 with a spacing, as shown in FIG. 21.

Figure 22:
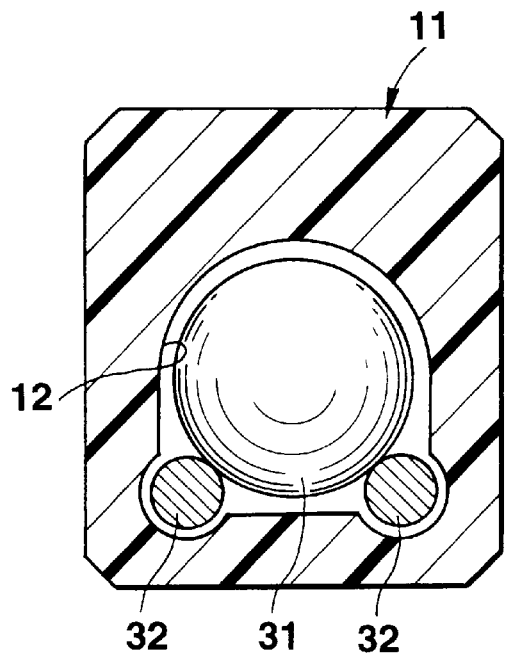
FIG. 22 is a cross-sectional view showing a state of the acceleration sensor to which an acceleration is applied.

When the acceleration sensor is moved downward and thereafter suddenly stopped, or the acceleration sensor is suddenly moved upward, that is, when an upward acceleration is applied to the acceleration sensor, the conductive ball 31 is moved downward against the vertical component force F2 of the magnetic force of the magnet 33 by the inertial force thereof and is brought into contact with the pair of electrode pins 32, as shown in FIG. 22. Thereby, the pair of electrode pins 32 are electrically connected with each other through the conductive ball 31 to output an acceleration detection signal. In the case, the vertical component force F2 for lifting the conductive ball 31 is the larger as the conductive ball 31 is moved downward by application of the acceleration from the lifted highest position, as shown in FIG. 23. Accordingly, even if the force for holding the conductive ball 31 at the highest position is made smaller, it is possible to ensure returning of the downward-moved conductive ball 31 to the highest position. Therefore, according to the embodiment, it is possible to make the vertical component force F2 of the magnetic force of the magnet 33 at the highest position smaller, and to detect even a further delicate acceleration.

Method for Manufacturing Acceleration Sensor

Next, an example of a manufacturing method of the acceleration sensor according to the fourth embodiment of the invention will be explained.

This manufacturing method comprises assembling the acceleration sensor shown in FIGS. 8 to 21, and thereafter increasing the heating temperature gradually several times to thermally demagnetize the magnet when it does not pass the operation test, in order to make the detection sensitivity of the acceleration sensor, for example, about 0.2 G.

The thermal demagnetizing in the manufacturing method will be explained in detail.

The thermal demagnetization is that the magnetic force of a magnet becomes weaker when the temperature of the magnet becomes higher by heating. Thereafter, even though the magnet is returned under the room temperature, the magnet is demagnetized in comparison with that prior to increasing the temperature of the magnet. Generally, a magnet has a characteristics that when the magnet is once magnetized by heating it to a particular temperature and thereafter leaving it under a high temperature, it becomes hard to demagnetize furthermore even if leaving it under a high temperature not more than the temperature.

Figure 25:
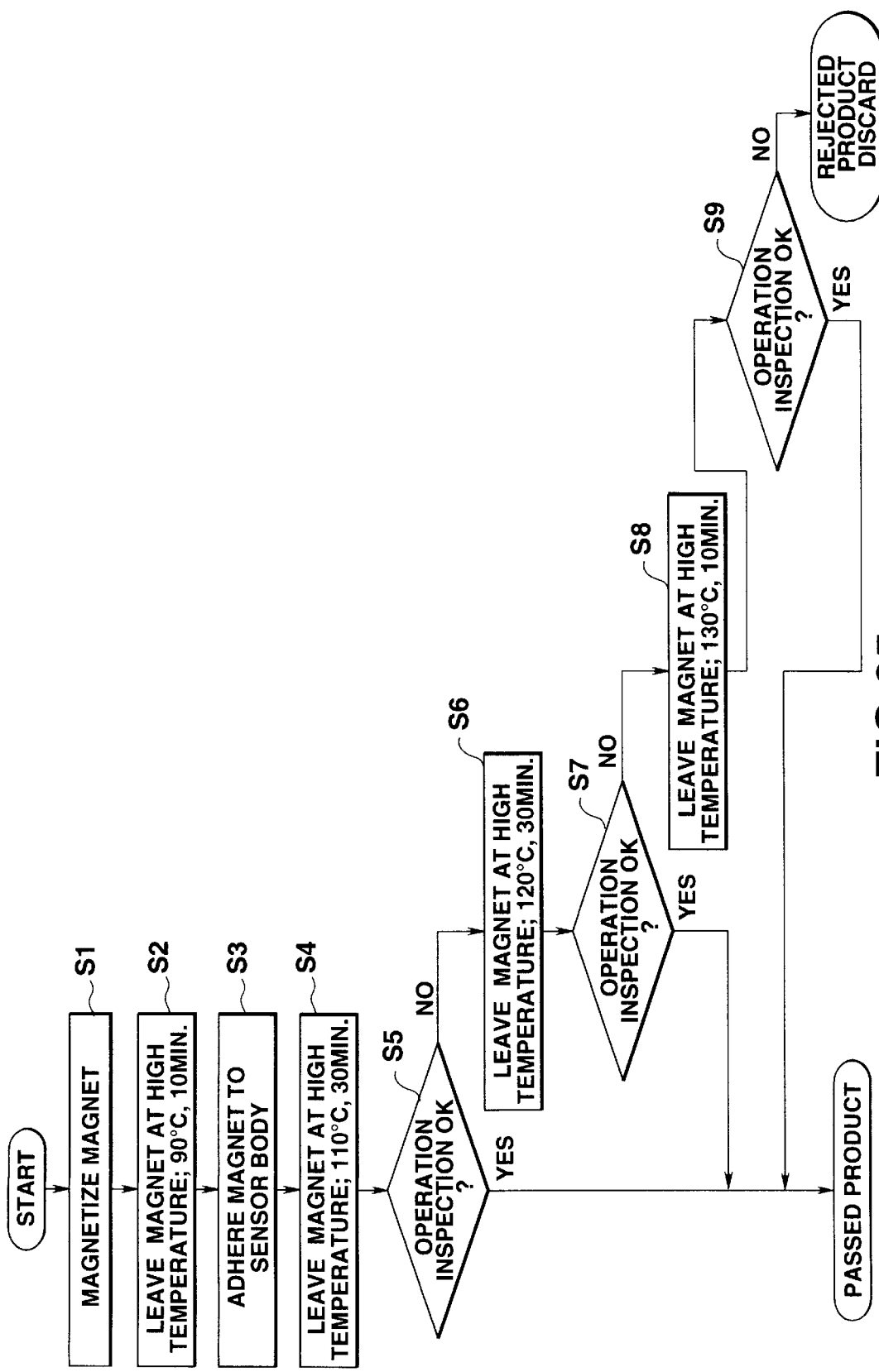
FIG. 25 is a flow chart of a method for adjusting the magnetic force of the magnet by thermal demagnetizing, in an example of the method for manufacturing the acceleration sensor.

A flow of a method for adjusting the magnetic force of a magnet by a thermal demagnetization for the mass-production of acceleration sensor is shown in FIG. 25.

Figure 28:
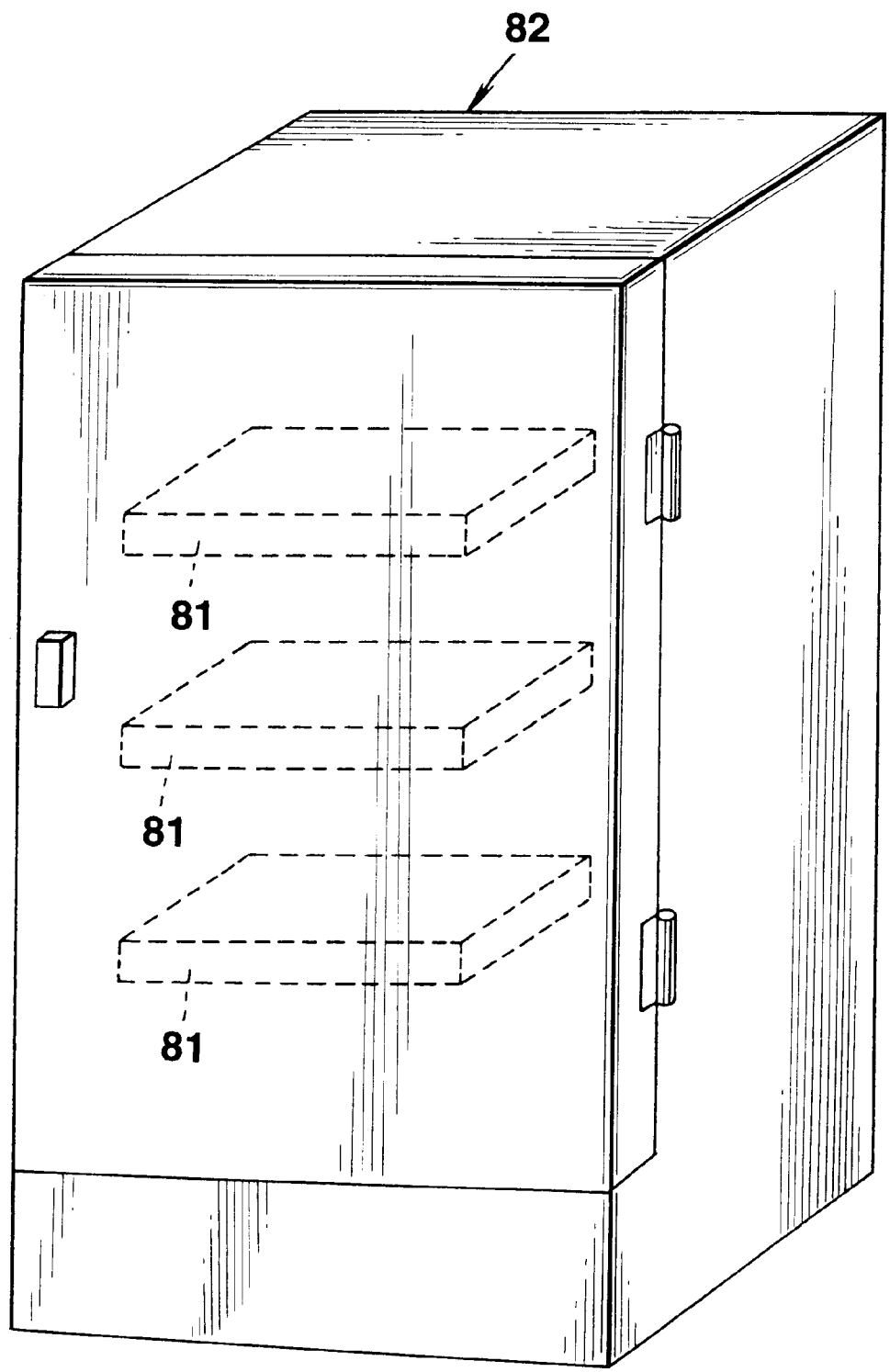
FIG. 28 is a perspective view of a thermostatic chamber which is used in the manufacturing method.

Magnets which were magnetized to have a magnetic force larger to some extent than a predetermined value at step S1 are used. The magnets 33 to which the magnetization treatment was performed but which are not incorporated in the second housing 21 yet, are put in a thermostat 82, as shown in FIG. 28, and are left as it is, at about 90° C. for about 10 minutes (step S2). This step is effective when the magnetic force of the magnetized magnet is too strong. The demagnetizing treatment at about 90° C. is for restraining the variation of demagnetized degree which becomes large when a thermal demagnetization treatment is carried out at a temperature not less than 100° C. with no preliminary treatment after an acceleration sensor was assembled.

Next, acceleration sensors are assembled (step S3), and thereafter are left as it is, at about 110° C. for about 30 minutes (step S4). This is for preventing the magnets from being thermally demagnetized even if the environmental temperature becomes to 80° C., in case of the proof temperature in the environment for use of the acceleration sensor 79 being −20° C. to +80° C. The leaving at about 110° C. for about 30 minutes is for giving a good margin. After such assembling was performed, an operation inspection for a number of acceleration sensors which were thermally demagnetized are performed (step S5).

Figure 26:
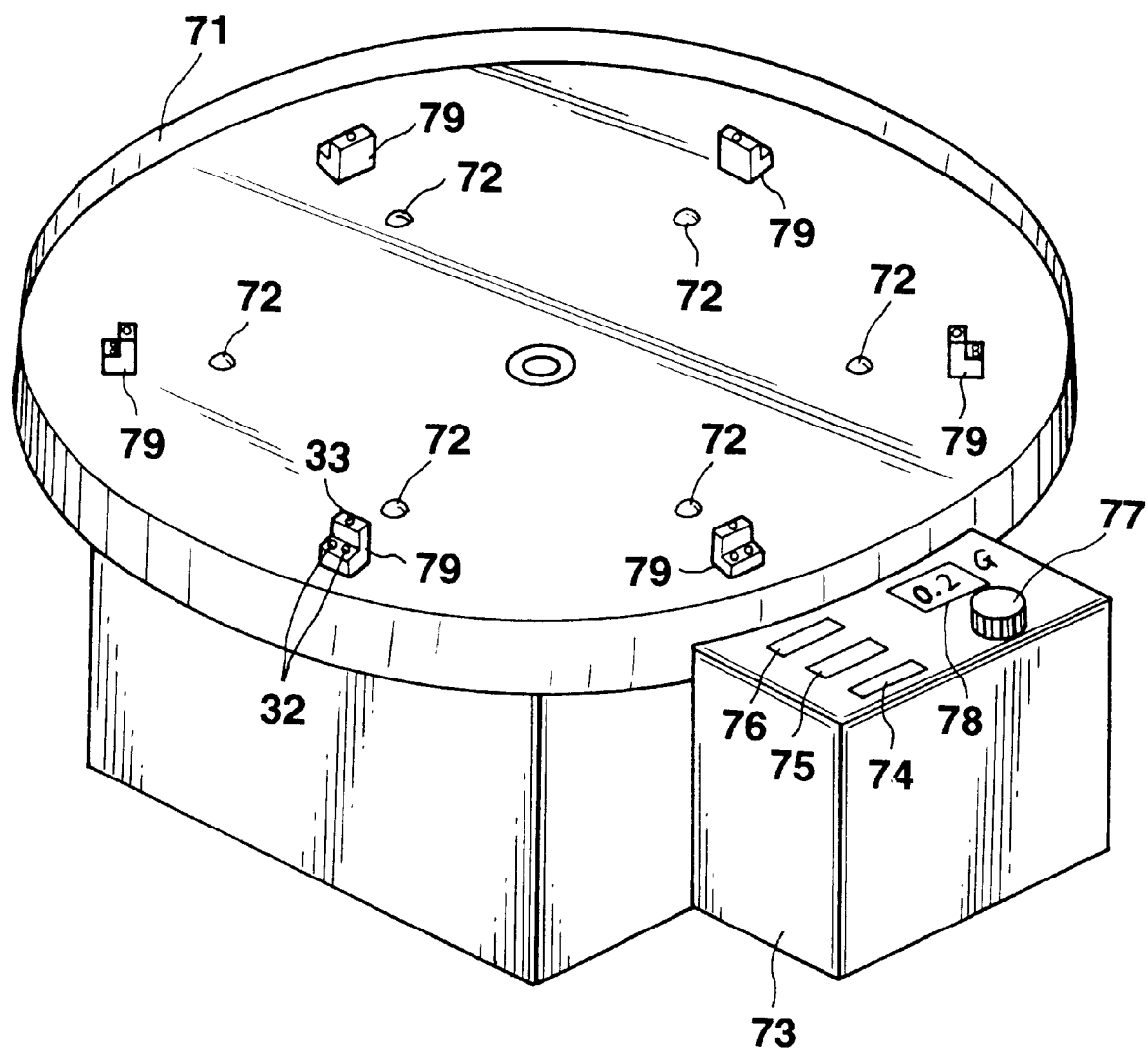
FIG. 26 is a perspective view of an example of an operation inspection equipment which is used in the manufacturing method.

FIG. 26 shows an example of an operation inspection apparatus used for carrying out such an operation inspection.

The operation inspection apparatus has a turn table 71. A plurality of pairs of electrode holes which are for inserting the top ends of plural pairs of electrode pins 32 which project toward the right side of the first housing 11 in each acceleration sensor shown in FIG. 20, are formed at regular intervals in the peripheral portion of the upper surface of the turn table 71, although they are not shown. At an inside position of each pair of holes on the upper surface, a lamp 72 is provided. In the vicinity of the turn table 71, a control panel 73 is provided. On the upper surface of the control panel 73, a start button 74, a stop button 75, a reset button 76, a dial 77 for setting a detection acceleration, and a display portion 78 for displaying the set acceleration are provided.

In order to carry out an operation inspection for acceleration sensors 79 by the operation inspection apparatus, the top ends of a pair of electrode pins 32 of each acceleration sensor 79 are inserted into a pair of electrode holes formed in the upper surface of the turn table 71. In the case, each acceleration sensor is arranged so that the bottom (the side in the sensitive direction) of the acceleration sensor shown in FIG. 20 faces to the outside on the turn table 71.

Next, the detection acceleration is set to 0.2 G by rotating the dial 77 to display it on the display portion 78, and the start button 74 is pushed. Then, the turn table 71 is rotated at a predetermined speed in a predetermined direction to give a predetermined centrifugal force to each acceleration sensor 79 on the turn table 71. When the conductive ball 31 of the acceleration sensor 79 is brought into contact with the pair of electrode pins 32 to output a detection signal, the lamp 72 lights up. On the contrary, when the conductive ball 31 is not brought into contact with the pair of electrode pins 32, the lamp 72 does not light up. The rotation of the turn table 71 is stopped by pushing the stop button 75.

The acceleration sensor 79 adjacent to the lighted-up lamp 72 is judged as a passed product and the acceleration sensor 79 adjacent to the not lighted-up lamp 72 is judged as a rejected product.

Thereafter, when pushing the reset button 76, the lighted-up lamps 72 are turned off. It is considered that the causes of a rejected product occurred in the first operation inspection is the presence of variation in magnetic force of the magnet 33, and the like.

Figure 27:
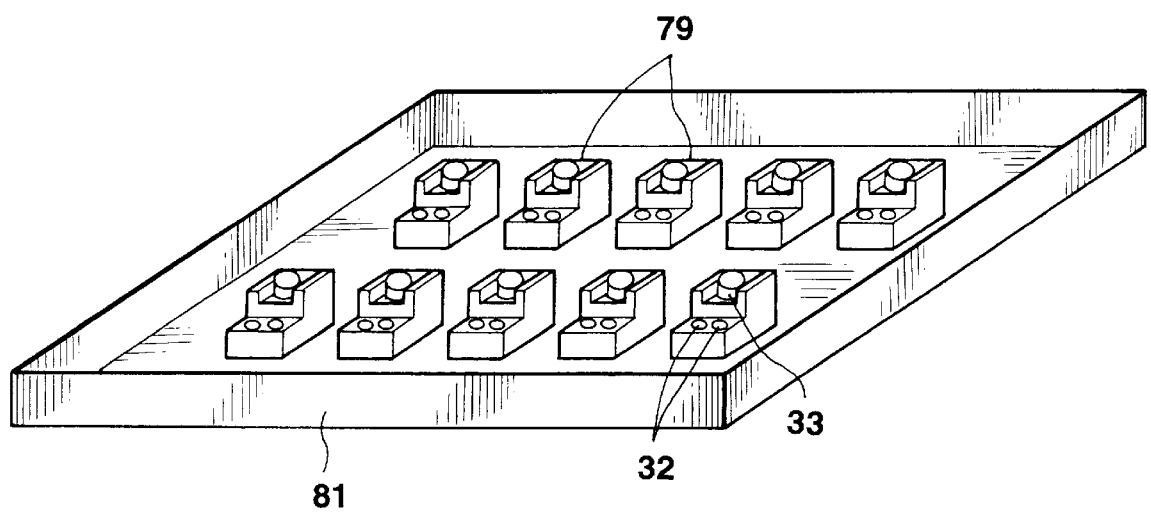
FIG. 27 is a perspective view of a tray which is used in the manufacturing method.

The acceleration sensors 79 judged as a rejected product are placed on a tray 81, as shown in FIG. 27.

As shown in FIG. 28, the tray 81 having the acceleration sensors 79 thereon which is not shown in the Figure, is put in the thermostat 82, and is left therein as it is, at about 120° C. for about 30 minutes, to demagnetize the magnet 33 (step S6).

Then, to the acceleration sensors 79 to which the above thermal demagnetizing treatment was performed, an operation inspection is conducted again by using the operation inspection apparatus shown in FIG. 26 (step S7). To the acceleration sensors 79 judged as rejected products again in this operation inspection, a thermal demagnetizing treatment is further conducted at a temperature higher than that of the preceding thermal demagnetizing treatment, i.e., 130° C. for about 30 minutes (step S8).

Then, to the acceleration sensors 79 to which this thermal demagnetizing treatment was performed, an operation inspection is further conducted by using the operation inspection apparatus shown in FIG. 26 (step S9). By such steps, acceleration sensors 79 are produced, in order to make passed products as much as possible.

The method for manufacturing an acceleration sensor according to the embodiment can be applied to manufacture types of acceleration sensor described later and shown in FIGS. 33A and 33B, and can be also applied to manufacture the type of acceleration sensor described later and shown in FIG. 40.

Application Example for Electronic Wristwatch

Figure 29:
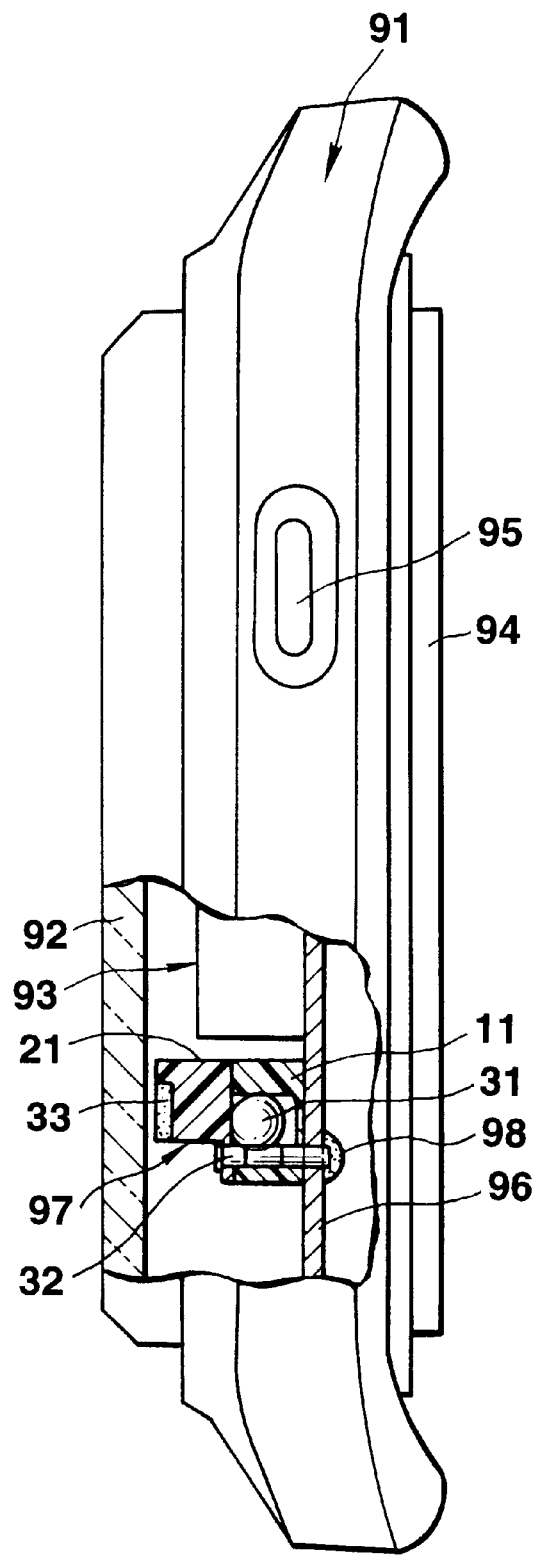
FIG. 29 is a side view including a partially sectional view, of the electronic wristwatch in which an acceleration sensor is used as a pedometer.
Figure 30:
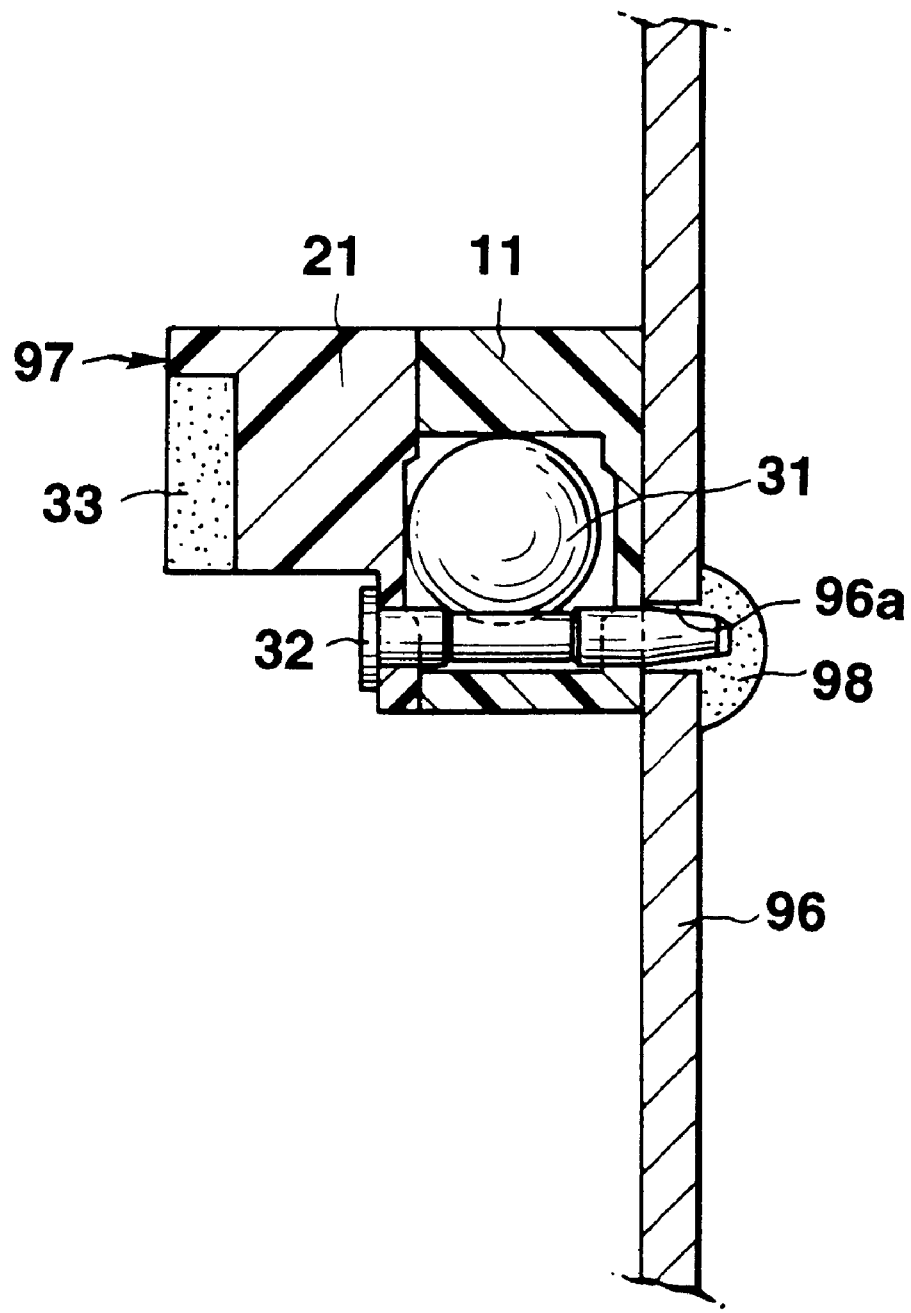
FIG. 30 is an enlarged view showing a portion of FIG. 29.

Next, an application of the acceleration sensor shown in FIG. 20 for an electronic wristwatch with a pedometer function will be explained with reference to FIGS. 29 to 31. FIG. 29 is a side view including a partially sectional view, of the electronic wristwatch, FIG. 30 is an enlarged view showing a portion thereof, and FIG. 31 is a side view showing a state of the electronic wristwatch attached to a waist band.

The electronic wristwatch comprises a case complete 91, a glass 92 attached to the upper surface (the left side surface in FIG. 29) of the case complete 91, a wristwatch module 93 contained therein, a case back 94 attached to the lower surface (the right side surface in FIG. 29) of the case complete 91, and various types of button switches 95 provided on the side surface of the case complete 91, which are used for mode change, time correction and the like.

The wristwatch module 93 is of a digital type and has a display portion such as a liquid crystal display device or the like, and a circuit board 96 therein. An acceleration sensor 97 is attached to the upper surface (the left side surface in FIG. 29) of the circuit board 96. That is, the acceleration sensor 97 is mounted to the circuit board 96 by inserting the top end of a pair of electrode pins 32, projecting to the right side of the first housing 11, into an attachment hole 96a to fix by using solder 98.

Figure 31:
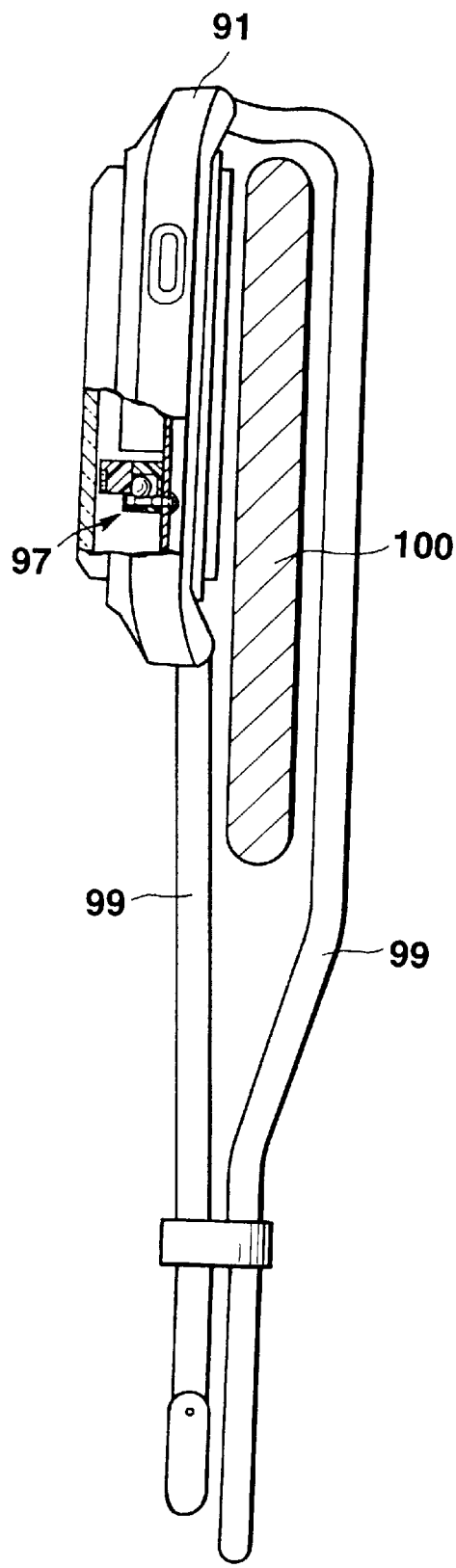
FIG. 31 is a side view showing a state of the electronic wristwatch attached to a waist band.

In order to use the electronic watch as a pedometer, the electronic watch is installed to a belt 100 for waist by using watch bands 99 provided to both sides of the case complete 91 so that the "twelve o'clock" side and the "six o'clock" side of the watch are at lower and upper positions, respectively, as shown in FIG. 31. In this state, the pair of electrode pins 32 in the acceleration sensor 97 are approximately horizontally arranged in parallel to each other and the conductive ball 31 is arranged at a position higher than that of the electrode pins 32, in the "twelve o'clock" side of the case complete 91.

When a person is walking with the electronic watch, an acceleration is caused to the acceleration sensor 97 every step to bring the conductive ball 31 into electrically contact with the pair of electrode pins 32 and thereby to output a detection signal.

As described above, according to the electronic wristwatch, when a person is walking with the electronic watch installed to the belt 100 for waist, an acceleration is caused to the acceleration sensor 97 every step to bring the conductive ball 31 into electrically contact with the pair of electrode pins 32 and thereby to output a detection signal, so that the number of steps can be counted on the basis of the detection signal. According to the acceleration sensor 97, it is possible to detect even a delicate acceleration, therefore, even if the person's stride is short to generate only a small acceleration, it is possible to ensure detecting the number of steps. According to the embodiment, it is possible to obtain an electronic wristwatch including a high-precision pedometer.

Fifth Embodiment

Figure 32:
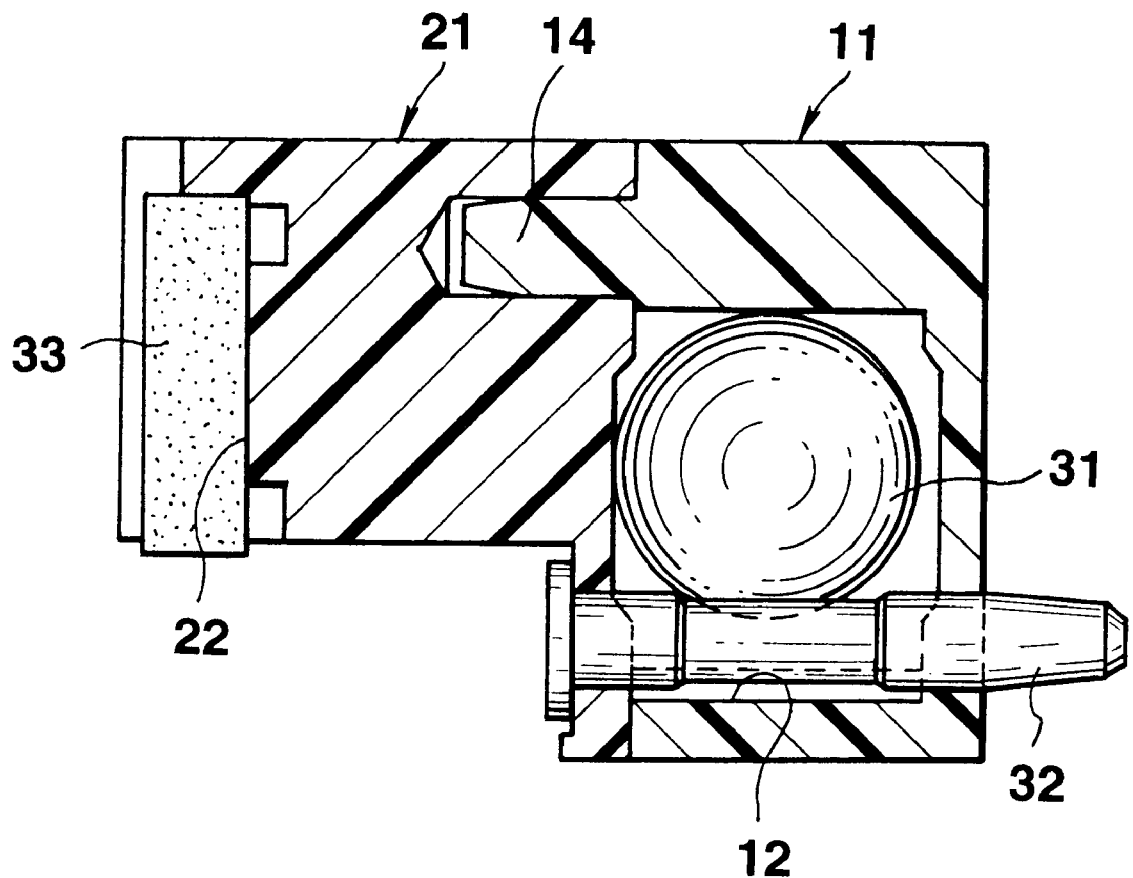
FIG. 32 is a perspective view of the acceleration sensor according to the fifth embodiment of the invention.

FIG. 32 is for explaining an acceleration sensor according to a fifth embodiment of the invention. To structural members, elements or the like corresponding to those shown in FIG. 20, the same reference numerals are attached, and the detailed explanation for them is properly omitted.

In this acceleration sensor, the length of a predetermined portion of the second housing 21, that is, the length between the magnet 33 contained in the containing recess portion 22 and the conductive ball 31 contained in the containing recess portion 12 of the first housing 11, is properly larger than that of FIG. 20. Therefore, in this acceleration sensor, because the distance between the magnet 33 and the conductive ball 31 is larger, that is, the magnetic force to the conductive ball 31 becomes the smaller as the magnet 33 is farther apart from the conductive ball 31, it is possible to easily adjust the detection sensitivity of the acceleration sensor, by preparing a plurality of types of acceleration sensors each having a different length of the predetermined portion of the second housing 21 to one another.

Sixth Embodiment

Figure 33A:
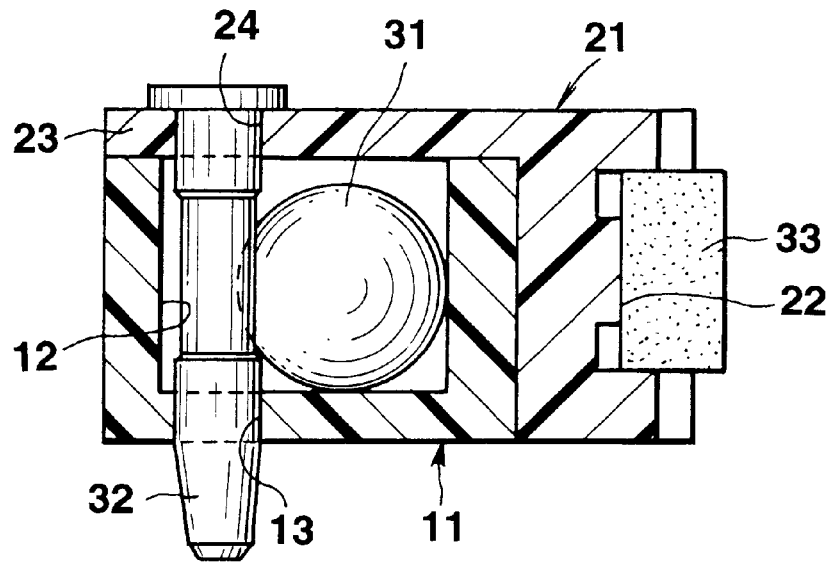
FIGS. 33A and 33B are cross-sectional views for explaining the acceleration sensor according to the sixth embodiment of the invention.
Figure 33B:
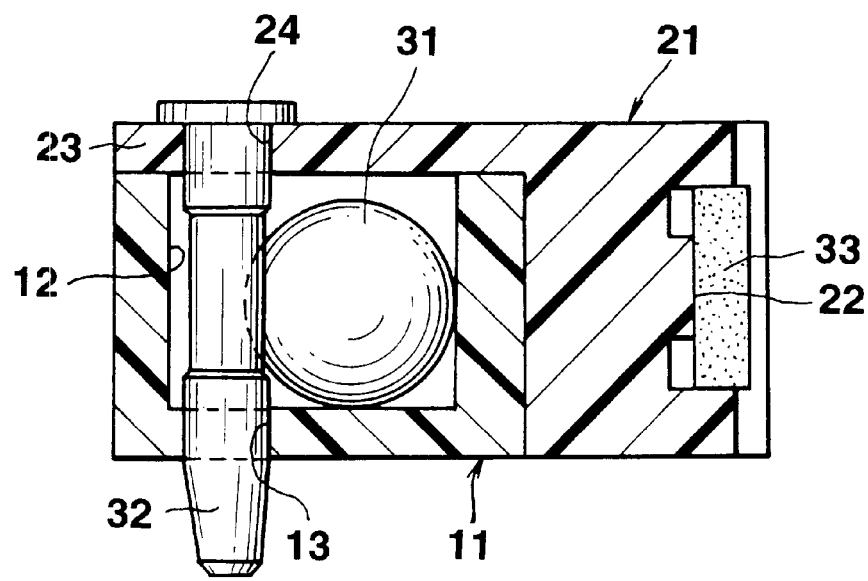

FIGS. 33A and 33B are for explaining an acceleration sensor according to a sixth embodiment of the invention. To structural members, elements or the like corresponding to those shown in FIG. 20, the same reference numerals are attached, and the detailed explanation for them is properly omitted.

In this acceleration sensor, a pair of electrode pins 32 are approximately vertically arranged in parallel to each other in a left side of a containing recess portion 12 of the first housing 11, the upper side of which is opened; and a conductive ball 31 is contained in a right side of the containing recess portion 12. The containing recess portion 12 of the first housing 11 is covered by a projecting portion 23 of the second housing 21. In a recess portion 22 formed in the right side of the second housing 21, a magnet 33 is contained.

In this case, the length of a predetermined portion of the second housing 21 in the acceleration sensor shown in FIG. 33A, that is, the length between the magnet 33 contained in the containing recess portion 22 and the conductive ball 31 contained in the containing recess portion 12 of the first housing 11, is properly smaller than that of FIG. 33B. Further, the thickness of the magnet 33 in the acceleration sensor shown in FIG. 33A is properly larger than that of FIG. 33B.

Therefore, according to the embodiment, it is possible to easily adjust the detection sensitivity of the acceleration sensor, by preparing a plurality of types of acceleration sensors each of which has a different length of the predetermined portion of the second housing 21 and has the magnet having a different thickness, to one another, and by combining them suitably.

Seventh Embodiment

Figure 34A:
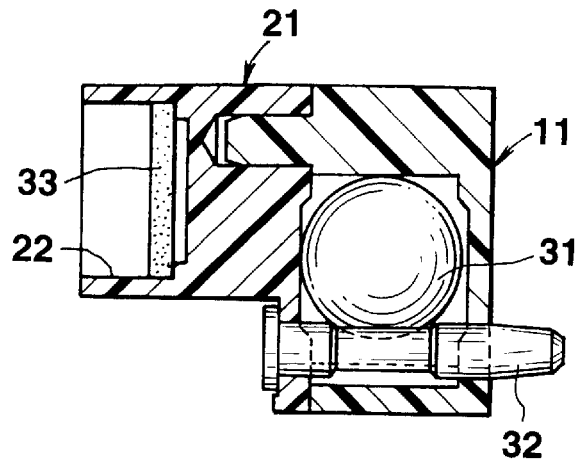
FIGS. 34A to 34C are cross-sectional views for explaining the acceleration sensor according to the seventh embodiment of the invention.
Figure 34B:
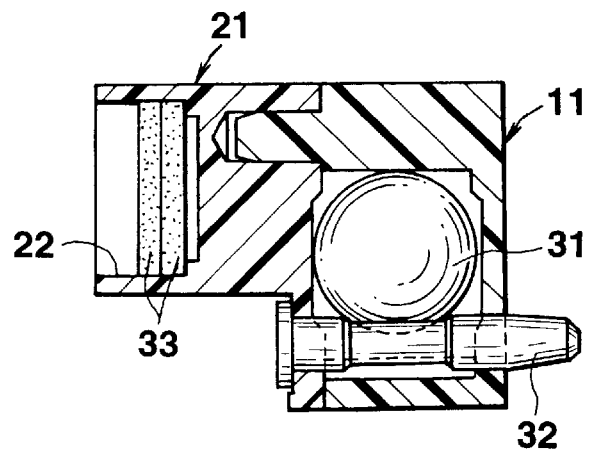
Figure 34C:
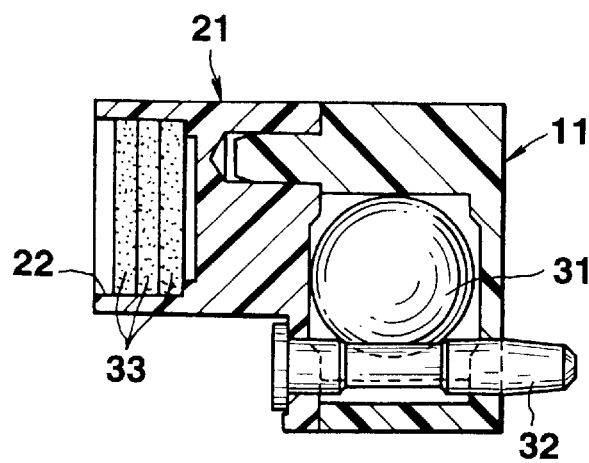

FIGS. 34A to 34C are for explaining an acceleration sensor according to a seventh embodiment of the invention. To structural members, elements or the like corresponding to those shown in FIG. 20, the same reference numerals are attached, and the detailed explanation for them is properly omitted.

In the acceleration sensor shown in FIG. 34A, a disc-shaped magnet 33 is contained in the containing recess portion 22 of the second housing 21 and is adhered thereto.

In the acceleration sensor shown in FIG. 34B, two disc-shaped magnets 33 laid on each other are contained in the containing recess portion 22 of the second housing 21 and are adhered thereto.

In the acceleration sensor shown in FIG. 34C, three disc-shaped magnets 33 laid on one another are contained in the containing recess portion 22 of the second housing 21 and are adhered thereto.

In the embodiment, because one to three magnets 33 are contained in the containing recess portion 22 of the second housing 21, it is possible to change the magnetic force of the magnet 33 to the conductive ball 31 by changing number of magnets 33 to be contained therein. That is, the magnetic force of the magnet 33 to the conductive ball 31 is the larger as the number of magnets to be contained is larger. Accordingly, it is possible to easily adjust the detection sensitivity of the acceleration sensor.

Eighth Embodiment

Figure 35A:
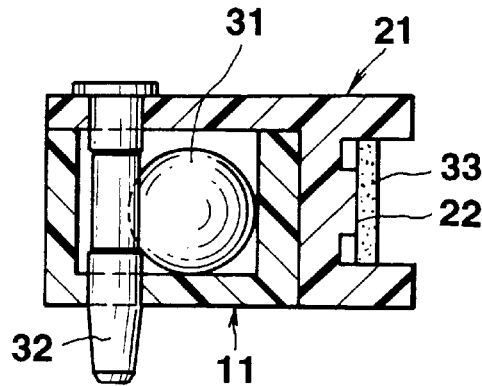
FIGS. 35A to 35C are cross-sectional views for explaining the acceleration sensor according to the eighth embodiment of the invention.
Figure 35B:
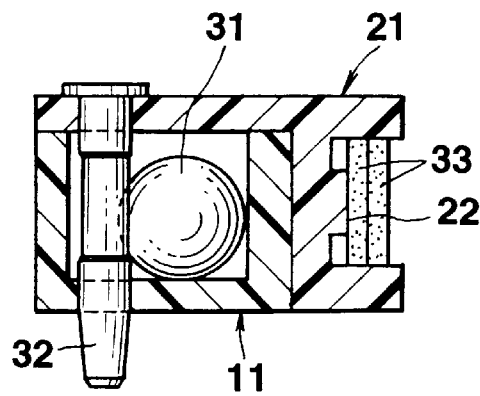
Figure 35C:
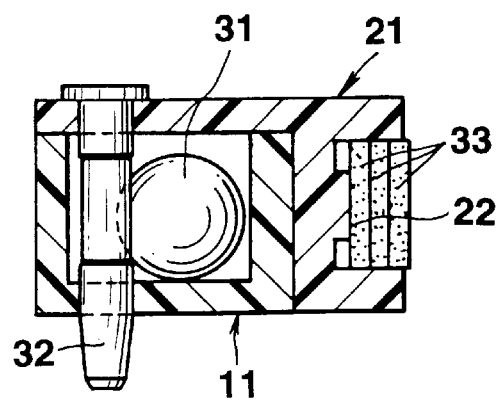

FIGS. 35A to 35C are for explaining an acceleration sensor according to an eighth embodiment of the invention. To structural members, elements or the like corresponding to those shown in FIGS. 33A and 33B, the same reference numerals are attached, and the detailed explanation for them is properly omitted.

In the acceleration sensor shown in FIG. 35A, a disc-shaped magnet 33 is contained in the containing recess portion 22 of the second housing 21 and is adhered thereto.

In the acceleration sensor shown in FIG. 35B, two disc-shaped magnets 33 laid on each other are contained in the containing recess portion 22 of the second housing 21 and are adhered thereto.

In the acceleration sensor shown in FIG. 35C, three disc-shaped magnets 33 laid on one another are contained in the containing recess portion 22 of the second housing 21 and are adhered thereto.

Therefore, according to the embodiment, it is possible to easily adjust the detection sensitivity of the acceleration sensor, like the embodiment shown in FIGS. 34A to 34C.

Ninth Embodiment

Figure 36:
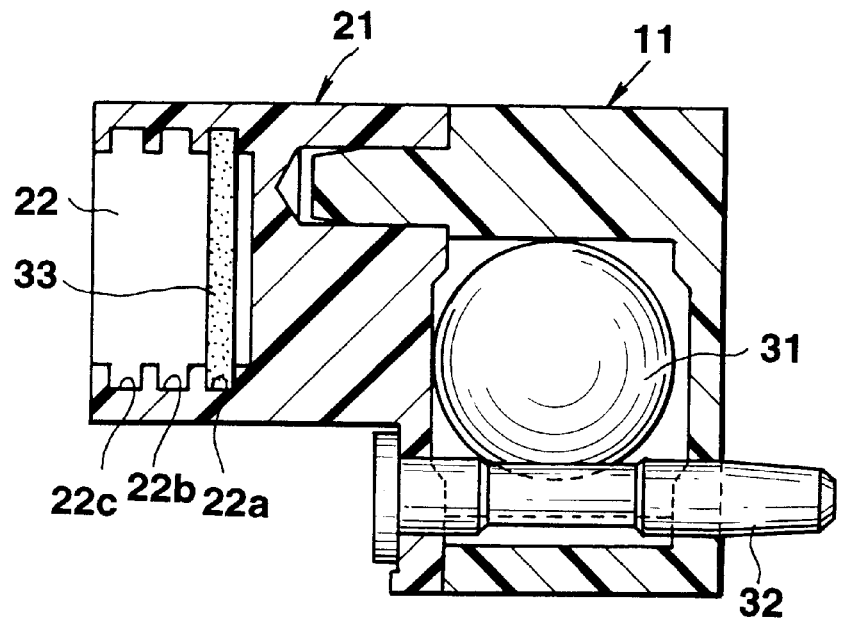
FIG. 36 is a cross-sectional view of the acceleration sensor according to the ninth embodiment of the invention.

FIG. 36 is for explaining an acceleration sensor according to a ninth embodiment of the invention. To structural members, elements or the like corresponding to those shown in FIG. 20, the same reference numerals are attached, and the detailed explanation for them is properly omitted.

In the acceleration sensor, a plurality of, for example, three, rack portions 22a to 22c are formed in the containing recess portion 22 of the second housing 21 so that a magnet 33 can be put in one of the three rack portions 22a to 22c. Because the magnetic force of the magnet 33 to the conductive ball 31 is changed according to the put-in position (set position) of the magnet 33, that is, the magnetic force to the conductive ball 31 becomes the smaller as the magnet 33 is farther apart from the conductive ball 31, it is possible to easily adjust the detection sensitivity of the acceleration sensor.

According to use of two magnets 33, it is also possible to easily adjust the detection sensitivity of the acceleration sensor by selecting a put-in state because there are three kinds of states for putting the two magnets in the three rack portions.

According to use of three magnets 33, it is also possible to easily adjust the detection sensitivity of the acceleration sensor, like the case of use of three magnets 33.

Tenth Embodiment

Figure 37:
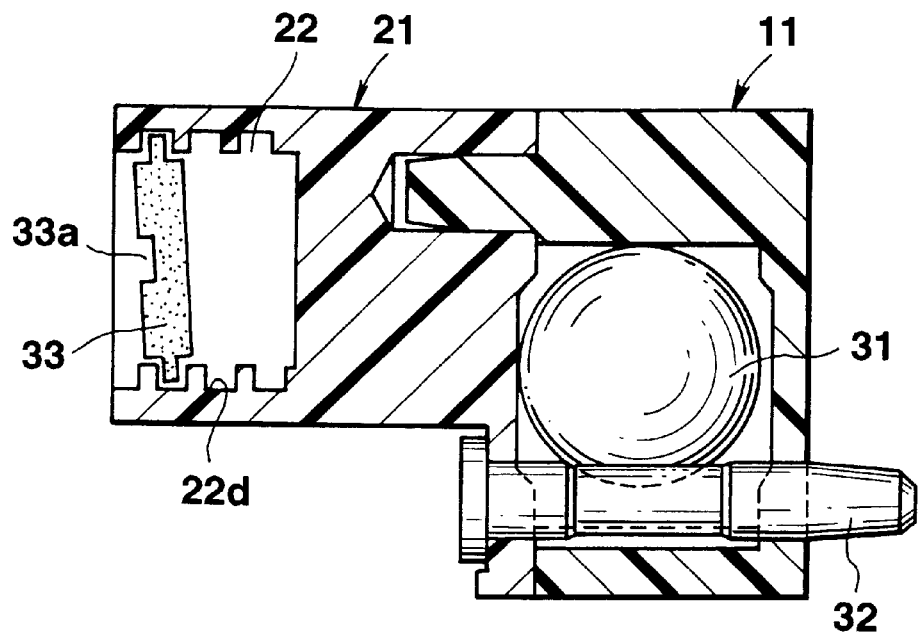
FIG. 37 is a cross-sectional view of the acceleration sensor according to the tenth embodiment of the invention.

FIG. 37 is for explaining an acceleration sensor according to a tenth embodiment of the invention. To structural members, elements or the like corresponding to those shown in FIG. 20, the same reference numerals are attached, and the detailed explanation for them is properly omitted.

In the acceleration sensor, a cylindrical containing recess portion 22 is formed in the second housing 21, and in the inner wall of the recess portion 22, a female screw groove 22d is formed. In a predetermined surface of the magnet 33, a plus-shaped or minus-shaped engagement groove 33a for a screw driver is formed. The magnet 33 is put in the recess portion 22 by screwed into the screw groove 22d.

According to the acceleration sensor having such a structure, because the put-in position of the magnet 33 can be adjusted by using a screw driver to change the magnetic force of the magnet 33 to the conductive ball 31 in a stepless manner, it is possible to easily adjust the detection sensitivity of the acceleration sensor in a stepless manner.

Eleventh Embodiment

Figure 38:
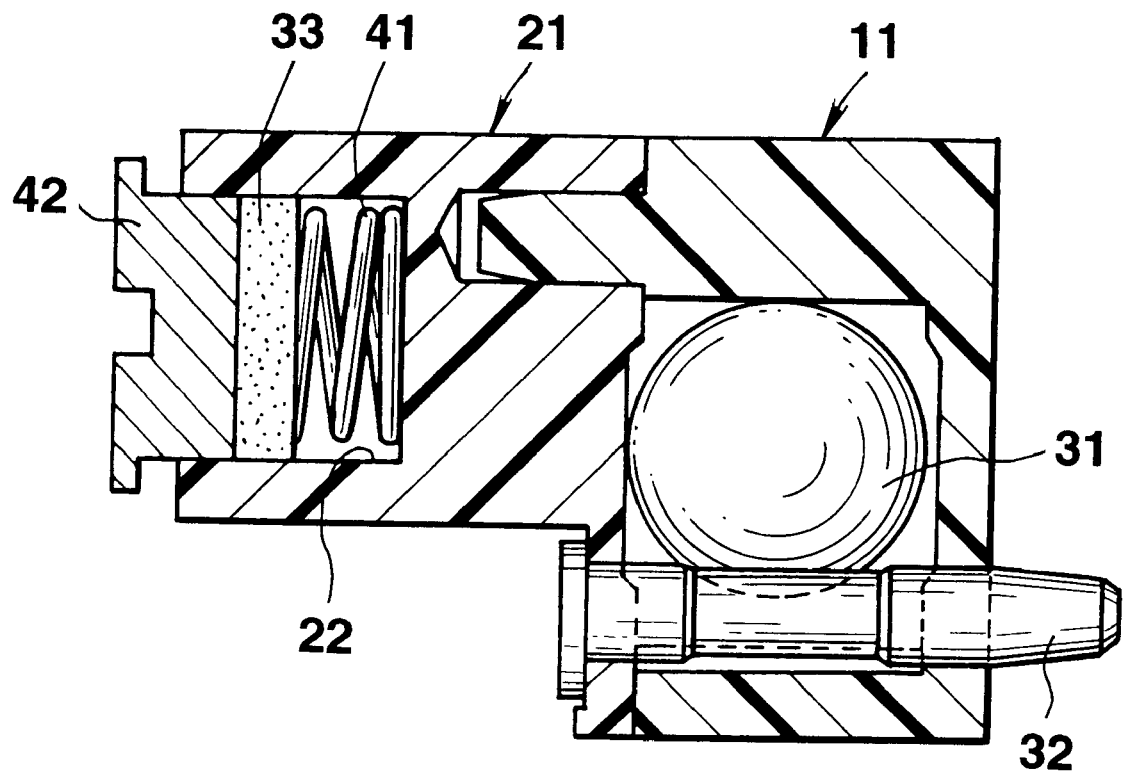
FIG. 38 is a cross-sectional view of the acceleration sensor according to the eleventh embodiment of the invention.

FIG. 38 is for explaining an acceleration sensor according to an eleventh embodiment of the invention. To structural members, elements or the like corresponding to those shown in FIG. 20, the same reference numerals are attached, and the detailed explanation for them is properly omitted.

In the acceleration sensor, a cylindrical containing recess portion 22 is formed in the second housing 21, and in the inner wall of the recess portion 22, a female screw groove which is not shown is formed. A compression coiled spring 41 and a magnet 33 are put into the recess portion 22 in this order, and further a male screw 42 is screwed into the female screw of the containing recess portion 22 from the upper side.

According to the acceleration sensor having such a structure, because the put-in position of the magnet 33 can be also adjusted by using a screw driver to change the magnetic force of the magnet 33 to the conductive ball 31 in a stepless manner, it is possible to easily adjust the detection sensitivity of the acceleration sensor in a stepless manner.

Twelfth to Fourteenth Embodiments

Figure 39A:
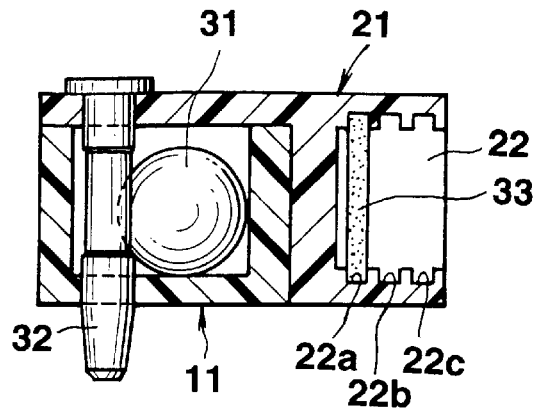
FIGS. 39A to 39C are cross-sectional views for explaining the acceleration sensors according to twelfth to fourteenth embodiments of the invention, respectively.
Figure 39B:
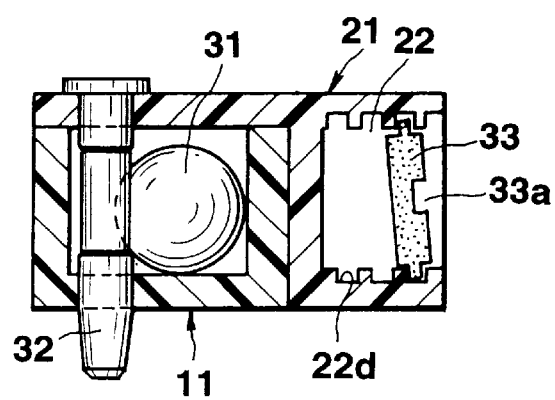
Figure 39C:
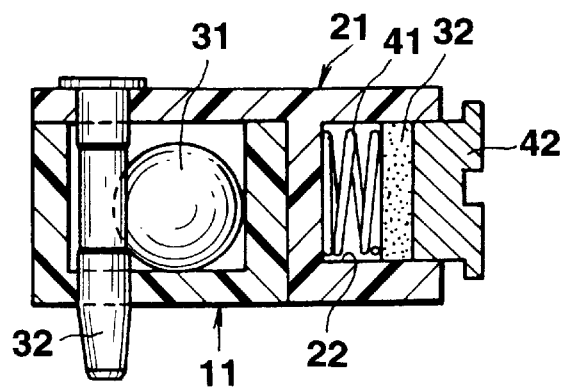

FIGS. 39A to 39C are for explaining acceleration sensors according to twelfth to fourteenth embodiments of the invention, respectively.

The acceleration sensor shown in FIG. 39A is one of a type shown in FIG. 33A, and in the acceleration sensor, a plurality of, for example, three, rack portions 22a to 22c are formed in the containing recess portion 22 of the second housing 21 so that a magnet 33 can be put in one of the three rack portions 22a to 22c, like one shown in FIG. 36. By changing the put-in position of the magnet 33 with respect to the rack portions 22a to 22c or the number of the magnets 33, it is possible to easily adjust the detection sensitivity of the acceleration sensor.

The acceleration sensor shown in FIG. 39B is one of a type shown in FIG, 33A, and in the acceleration sensor, a cylindrical containing recess portion 22 is formed in the second housing 21, and in the inner wall of the recess portion 22, a female screw groove 22d is formed. In a predetermined surface of the magnet 33, a plus-shaped or minus-shaped engagement groove 33a for a screw driver is formed, and the magnet 33 is put in the recess portion 22 by screwed into the screw groove 22d, like one shown in FIG. 37. By adjusting the put-in position of the magnet 33 by using a screw driver, it is possible to easily adjust the detection sensitivity of the acceleration sensor in a stepless manner.

The acceleration sensor shown in FIG. 39C is one of a type shown in FIG, 33A, and in the acceleration sensor, a cylindrical containing recess portion 22 is formed in the second housing 21, and in the inner wall of the recess portion 22, a female screw groove which is not shown is formed, like one shown in FIG. 38. A compression coiled spring 41 and a magnet 33 are put into the recess portion 22 in this order, and further a male screw 42 is screwed into the female screw of the containing recess portion 22 from the upper side. By adjusting the put-in position of the magnet 33 by using a screw driver, it is possible to easily adjust the detection sensitivity of the acceleration sensor in a stepless manner.

Fifteenth Embodiment

Figure 40:
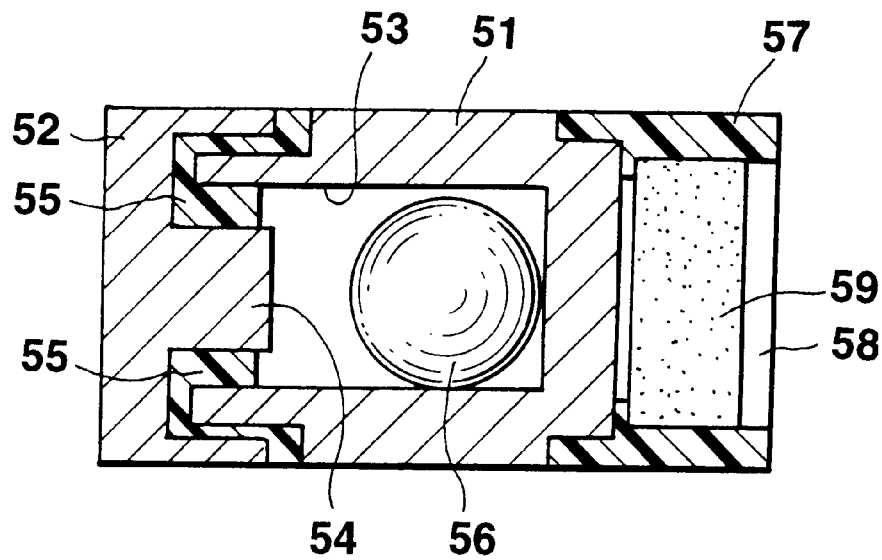
FIG. 40 is a cross-sectional view of the acceleration sensor according to the fifteenth embodiment of the invention.

FIG. 40 is for explaining an acceleration sensor according to a fifteenth embodiment of the invention.

The acceleration sensor has a first combined electrode and housing 51 and a second combined electrode and housing 52. At a predetermined position of the first combined electrode and housing 51, a containing recess portion 53 is formed. On the central portion of a predetermined surface of the second combined electrode and housing 52, a projective portion 54 is provided. The predetermined surface of the first combined electrode and housing 51 and the predetermined surface of the second combined electrode and housing 52 is joined to each other through an insulating member 55. In such a state, the second combined electrode and housing 52 covers the containing recess portion 53 of the first combined electrode and housing 51, and is insulated with the first combined electrode and housing 51.

The projective portion 54 of the second combined electrode and housing 52 passes through the insulating member 55, and the top end thereof is located in the containing recess portion 53 of the first combined electrode and housing 51. In the containing recess portion 53 of the first combined electrode and housing 51, a conductive ball 56 is provided to be movable in the right and left directions, that is, so that the conductive body 56 can be brought into contact with or separated from the projective portion 54 of the second electrode and housing 52.

On the surface opposite to the predetermined surface of the first combined electrode and housing 51, an insulating member 57 is provided. The insulating member 57 is provided with a containing recess portion 58. In this case, a magnet 59 is contained in the containing recess portion 58.

Therefore, it is possible to easily adjust the detection sensitivity of the acceleration sensor by changing the thickness of the magnet 59 contained therein. For this purpose, the number of the magnet 59 contained in the containing recess portion 58 may be changed, like the embodiment shown in FIGS. 34A to 34C.

In an ordinary state of the acceleration sensor, the conductive ball 56 is attracted to move to the right side by the magnetic force of the magnet 59, and is held at a position apart from the projective portion 54 of the second combined electrode and housing 52 toward the right side. When the acceleration sensor is moved to the left side and is suddenly stopped, or the acceleration sensor is suddenly moved to the right side, that is, when an acceleration in the right direction is applied to the acceleration sensor, the conductive ball 56 is moved to the left side by the inertial force thereof against the magnetic force of the magnet 59, to bring into contact with the projective portion 54 of the second combined electrode and housing 52. Accordingly, the first combined electrode and housing 51 and the second combined electrode and housing 52 are electrically connected with each other through the conductive ball 56 to output an acceleration detection signal.

Sixteenth Embodiment

Figure 41:
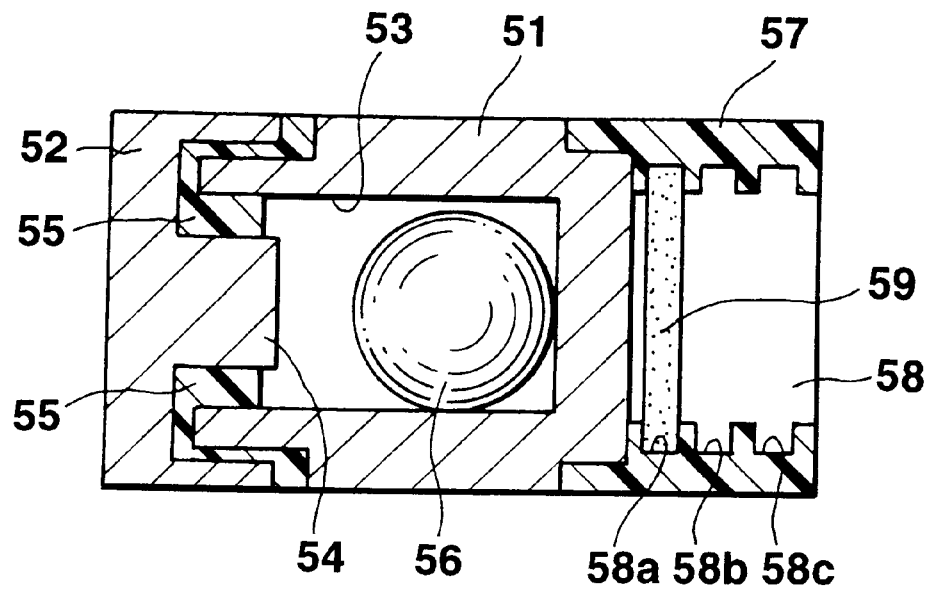
FIG. 41 is a cross-sectional view of the acceleration sensor according to the sixteenth embodiment of the invention.

FIG. 41 is for explaining an acceleration sensor according to a sixteenth embodiment of the invention. To structural members, elements or the like corresponding to those shown in FIG. 40, the same reference numerals are attached, and the detailed explanation for them is properly omitted.

In the acceleration sensor, a plurality of, for example, three, rack portions 58a to 58c are formed in the containing recess portion 58 of the insulating member 57 so that a magnet 59 can be put in one of these rack portions 58a to 58c.

According to the acceleration sensor, it is possible to easily adjust the detection sensitivity thereof by changing the put-in position into one of the rack portions 58a to 58c, for the magnet 59, or the number of magnets to be used, like the acceleration sensor shown in FIG. 36.

Seventeenth Embodiment

Figure 42:
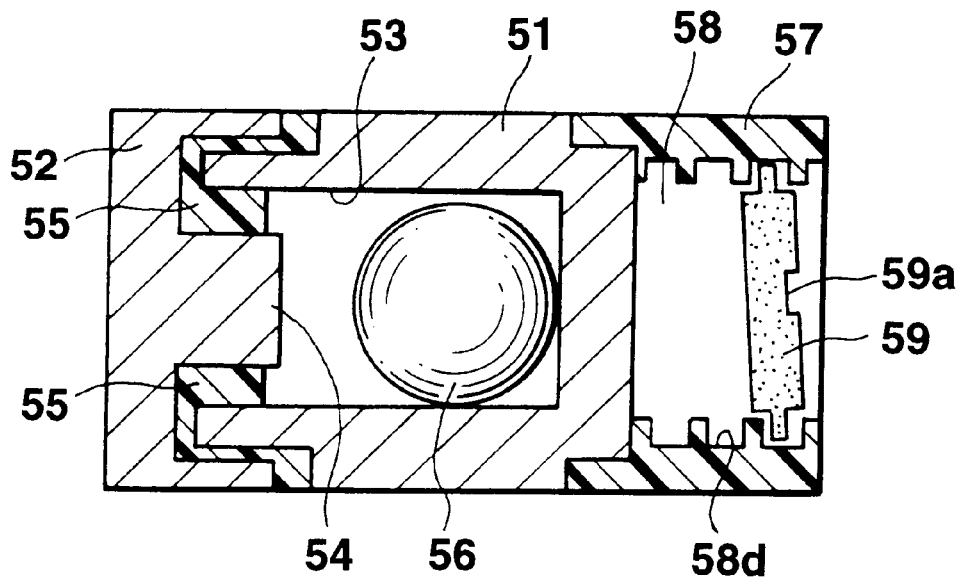
FIG. 42 is a cross-sectional view of the acceleration sensor according to the seventeenth embodiment of the invention.

FIG. 42 is for explaining an acceleration sensor according to a seventeenth embodiment of the invention. To structural members, elements or the like corresponding to those shown in FIG. 40, the same reference numerals are attached, and the detailed explanation for them is properly omitted.

In the acceleration sensor, a cylindrical containing recess portion 58 is formed in the insulating member 57, and in the inner wall of the recess portion 58, a female screw groove 58d is formed. In a predetermined surface of the magnet 59, a plus-shaped or minus-shaped engagement groove 59a for a screw driver is formed. The magnet 59 is put in the recess portion 58 by screwed into the screw groove 58d.

According to the acceleration sensor having such a structure, because the put-in position of the magnet 59 can be adjusted by using a screw driver, it is possible to easily adjust the detection sensitivity of the acceleration sensor in a stepless manner, like the acceleration sensor shown in FIG. 37.

Eighteenth Embodiment

Figure 43:
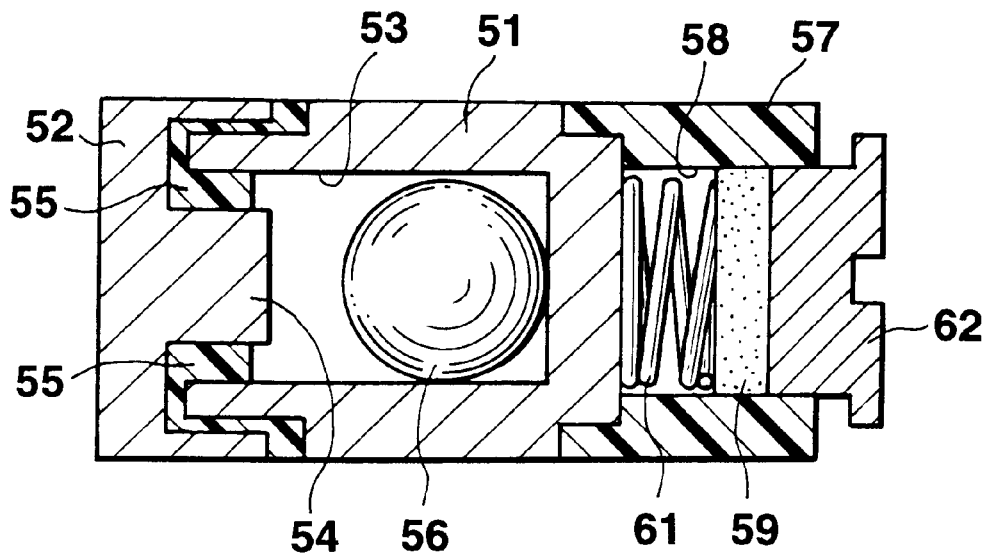
FIG. 43 is a cross-sectional view of the acceleration sensor according to the eighteenth embodiment of the invention.

FIG. 43 is for explaining an acceleration sensor according to an eighteenth embodiment of the invention. To structural members, elements or the like corresponding to those shown in FIG. 40, the same reference numerals are attached, and the detailed explanation for them is properly omitted.

In the acceleration sensor, a cylindrical containing recess portion 58 is formed in the insulating member 57, and in the inner wall of the recess portion 58, a female screw groove which is not shown is formed. A compression coiled spring 61 and a magnet 59 are put into the recess portion 58 in this order, and further a male screw 62 is screwed into the female screw of the containing recess portion 58 from the upper side.

According to the acceleration sensor having such a structure, because the put-in position of the magnet 59 can be also adjusted by using a screw driver, it is possible to easily adjust the detection sensitivity of the acceleration sensor in a stepless manner.

The invention is not limited to the above embodiments. For example, in the fourth embodiment, only an arrangement of the magnet 33 at an upper-left position of the conductive ball 31 is explained. However, the magnet 33 may be arranged at a lower-left position of the conductive ball 31. In an ordinary state of the acceleration sensor under such an arrangement, the conductive ball 31 is in contact with the pair of electrode pins 32, and when an acceleration is applied to the acceleration sensor, the conductive ball 31 is moved upward against the vertical component force F2 of the magnetic force of the magnet 33 to separate from the pair of electrode pins 32.

In the case of an acceleration sensor of the type shown in FIG. 40, it is possible to make it to one of the above-described type of acceleration sensor by disposing the insulating member 57 having the magnet 59 in the left side of the second combined electrode and housing 52.

In the fourth embodiment, although only a case of the pair of parallel electrode pins 32 being arranged in an approximately horizontal state is explained, it is not necessarily required to arrange them horizontally. For example, the electrode pins 32 may be inclined within 30o so that the position of each end in the side of the magnet 33, of the electrode pins 32 is lower than that of the other end.

In the above embodiments, although the two parallel electrode pins 32 are used as a pair of electrode members, the present invention is not limited to this, for example, a pair of electrode plates or a pair of electrode contacts can be also used as the electrode members.

As described above, according to the acceleration sensor of the above embodiment, it is possible to prevent magnetization of the conductive ball because the magnet which was previously magnetized is incorporated, and thereby it is possible to detect even delicate acceleration stably.

Because the magnet is incorporated at a predetermined outer portion of the housing, it is possible to easily exchange the magnet for another one having a different thickness and thereby to easily adjust the detection sensitivity of the acceleration sensor.

According to the method for manufacturing an acceleration sensor of the above embodiment, because the magnet is thermally demagnetized by increasing the temperature for heating the detecting device to a predetermined temperature at least one time, after assembling, it is possible to easily adjust the detection sensitivity of the acceleration sensor.

Because the magnet is incorporated at a predetermined outer portion of an electrode and housing in one, it is possible to easily exchange the magnet for another one having a different thickness and thereby to easily adjust the detection sensitivity of the acceleration sensor.

Because the acceleration sensor of the above embodiment have a structure which enables adjustment of the magnitude of the magnetic force of the magnet, it is possible to easily adjust the detection sensitivity of the acceleration sensor.

According to the acceleration sensor of the above embodiment, because the position for arranging the magnet, and the number and size of the magnet can be adjusted, it is possible to easily adjust the detection sensitivity of the acceleration sensor.

What is claimed is:

1. A detecting device comprising:

a device body having a containing chamber formed therein;

a plurality of electrode members which are provided in the containing chamber in parallel to one another;

a conductive movable body which is movably arranged in a space surrounded by the plurality of electrode members; and a magnet which generates a magnetic holding force for holding the conductive movable body;

wherein when an external force is applied to the device body, the conductive movable body is moved against the magnetic holding force of the magnet and is brought into electrical contact with at least two of the plurality of electrode members, thereby causing a detection signal corresponding to the electrical contact to be output.

2. A detecting device as claimed in claim 1, wherein:

the plurality of electrode members are horizontally arranged, and the magnet is arranged so that a central position of the magnet is above an arrangement position of the plurality of electrode members.

3. A detecting device as claimed in claim 1, wherein:

the plurality of electrode members are horizontally arranged, the magnet has a plate-like shape and is magnetized in a thickness direction thereof, and the magnet and the plurality of electrode members are disposed to have a positional relationship such that the thickness direction of the magnet intersects an axis direction of the plurality of electrode members.

4. A detecting device as claimed in claim 1, wherein:

the plurality of electrode members comprise electrode pins, and the conductive movable body comprises a spherical body and is movably provided on an upper side of the electrode pins.

5. An electronic apparatus comprising:

(i) a detecting device including:

a device body having a containing chamber formed therein;

a plurality of electrode members which are provided in the containing chamber in parallel to one another;

a conductive movable body which is movably arranged in a space surrounded by the plurality of electrode members; and a magnet which generates a magnetic holding force for holding the conductive movable body;

wherein when an external force is applied to the device body, the conductive movable body is moved against the magnetic holding force of the magnet and is brought into electrical contact with at least two of the plurality of electrode members, thereby causing a detection signal corresponding to the electrical contact to be output; and (ii) a processing means for performing a a processing operation in accordance with the detection signal output by the detecting device.

6. A detecting device comprising:

an insulating device body having a containing chamber formed therein;

a plurality of electrode members which are provided in the device body in parallel to one another such that the electrode members pass through the containing chamber and such that a portion of each of the electrode members projects out of the device body;

a conductive movable body which is movably arranged in the containing chamber for bringing a pair of adjacent ones of the electrode members into electrical contact with each other to thereby cause a detection signal to be output; and a magnet which generates a magnetic holding force for holding the conductive movable body spaced apart from each of the electrode members when no external force is applied to the detecting device.

7. An electronic apparatus comprising:
(i) a detecting device including:
an insulating device body having a containing chamber formed therein;
a plurality of electrode members which are provided in the device body in parallel to one another such that the electrode members pass through the containing chamber and such that a portion of each of the electrode members projects out of the device body;
a conductive movable body which is movably arranged in the containing chamber for bringing a pair of adjacent ones of the electrode members into electrical contact with each other to thereby cause a detection signal to be output; and
a magnet which generates a magnetic holding force for holding the conductive movable body spaced apart from each of the electrode members when no external force is applied to the detecting device; and
(ii) a substrate on which the detecting device is mounted and through which a portion of at least one of the electrode members extends.

8. A method for manufacturing a detecting device comprising:
providing an insulating housing having a containing chamber formed therein;
providing a pair of electrodes in the containing chamber of the housing;
movably arranging a conductive body in the containing chamber of the housing such that the conductive body can be brought into contact with and separated from the pair of electrodes; and
providing a previously magnetized magnet at a predetermined outer position in the housing after the conduction body has been arranged in the containing chamber, said magnet generating a magnetic force for holding the conductive body at a predetermined position with respect to the pair of electrodes when no external force is applied to the detecting device.

9. A method for manufacturing a detecting device, comprising:
a first step of assembling an insulating housing having a containing chamber formed therein, a pair of electrodes which are provided in the containing chamber of the housing, a conductive body which is movably arranged in the containing chamber of the housing such that the conductive body can be brought into contact with and separated from the pair of electrodes, and a magnet which has been previously magnetized to generate a magnetic holding force for holding the conductive body at a predetermined position with respect to the pair of electrodes when no external force is applied to the detecting device, wherein the magnet is provided at a predetermined outer position in the housing; and
a second step of thermally demagnetizing the magnet by increasing a temperature for heating the detecting device to a predetermined temperature at least one time.

10. A detecting device comprising:
a first electrode which is provided with a containing recess portion formed therein;
a second electrode which is provided on and insulated from the first combined electrode and housing so as to cover the containing recess portion of the first combined electrode and housing;
a conductive body which is movably arranged in the containing recess portion of the first electrode such that the conductive body can be brought into contact with and separated from the second electrode; and
a magnet which has been previously magnetized to generate a magnetic holding force for holding the conductive body at a predetermined position with respect to the second electrode when no external force is applied to the detecting device;
wherein the first and second electrodes are combined to form a housing, and the previously magnetized magnet is provided at a predetermined outer position of the housing after the conductive body has been arranged in the containing recess portion.

11. A detecting device as claimed in claim 10, further comprising a magnetic force adjusting portion for adjusting a magnitude of the magnetic holding force of the magnet.

12. A detecting device as claimed in claim 11, wherein the magnetic force adjusting portion comprises means for adjusting at least one of a position, number, and size of the magnet.

13. A detecting device as claimed in claim 10, further comprising an insulating member coupled to said housing, and wherein the magnet is arranged in said insulating member.

* * * * *